(12) United States Patent
Yamada et al.

(10) Patent No.: US 8,711,453 B2
(45) Date of Patent: Apr. 29, 2014

(54) DATA PROCESSING APPARATUS AND DATA PROCESSING METHOD FOR REDUCING AN UNEVEN COLOR MADE UP OF TWO OR MORE INK COLORS

(75) Inventors: Akitoshi Yamada, Yokohama (JP);
Nobutaka Miyake, Yokohama (JP);
Makoto Torigoe, Tokyo (JP); Tohru Ikeda, Yokohama (JP); Fumitaka Goto, Tokyo (JP); Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 13/110,542

(22) Filed: May 18, 2011

(65) Prior Publication Data

US 2011/0285780 A1   Nov. 24, 2011

(30) Foreign Application Priority Data

May 24, 2010   (JP) .................................. 2010-118673

(51) Int. Cl.
*G03F 3/08* (2006.01)
*H04N 1/60* (2006.01)

(52) U.S. Cl.
CPC .................................. *H04N 1/6019* (2013.01)
USPC .......................................... 358/518; 358/1.9

(58) Field of Classification Search
CPC .................................................... H04N 1/6019
USPC ...................................................... 358/518, 1.9
See application file for complete search history.

(56) References Cited

U.S. PATENT DOCUMENTS

| | | | |
|---|---|---|---|
| 6,025,929 A | 2/2000 | Nakajima et al. | |
| 2004/0021882 A1* | 2/2004 | Kakutani | 358/518 |
| 2005/0219588 A1* | 10/2005 | Yoshida | 358/518 |
| 2006/0066927 A1* | 3/2006 | Tanaka | 358/518 |
| 2008/0291476 A1* | 11/2008 | Higuchi | 358/1.9 |
| 2011/0051208 A1* | 3/2011 | Hirano et al. | 358/518 |

FOREIGN PATENT DOCUMENTS

JP            10-013674 A     1/1998

\* cited by examiner

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

The present invention reduces an uneven color of a color having two or more colors of inks, the uneven color occurring due to manufacturing variations of ink ejection nozzles and so on. Each of a plurality of correction tables that is assigned to each predetermined number of nozzles that are used for printing on a common region in the print medium, of a plurality of nozzle arrays formed on a print head, each of the nozzle arrays ejecting a plurality of inks including a first ink and a second ink whose color is different from the color of the first ink, is generated on the basis of at least an ink ejection property of nozzles ejecting the first and second inks.

20 Claims, 22 Drawing Sheets

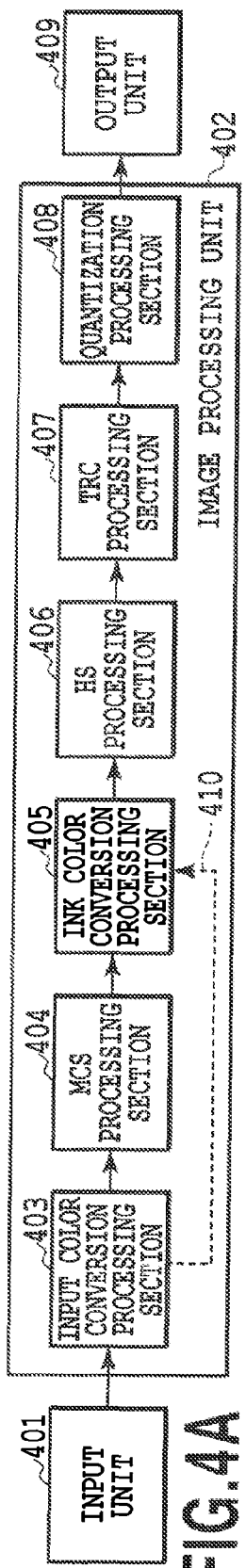
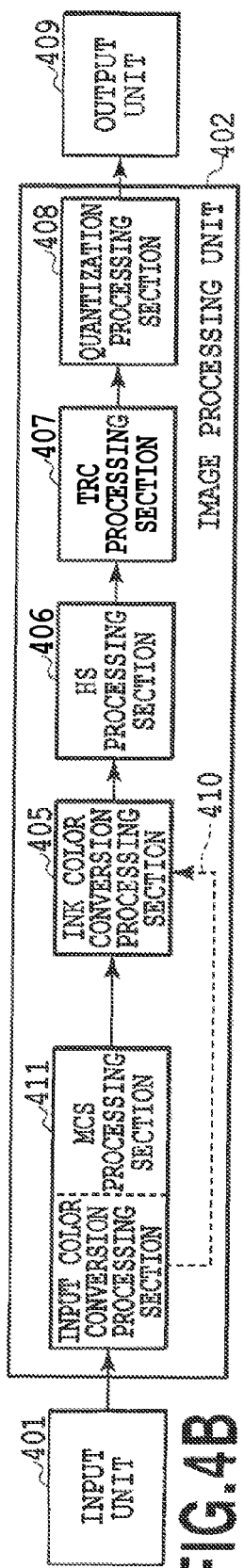
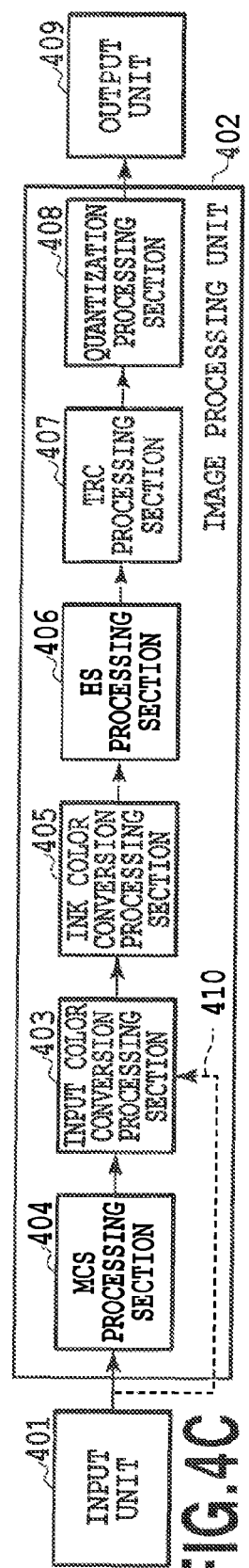
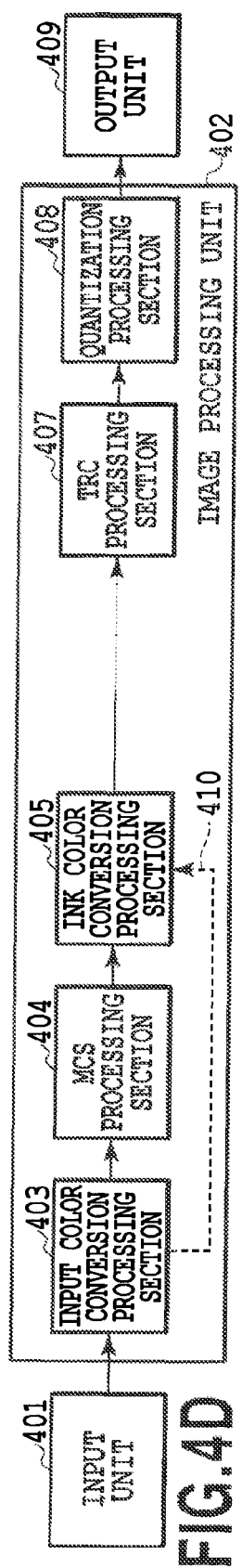

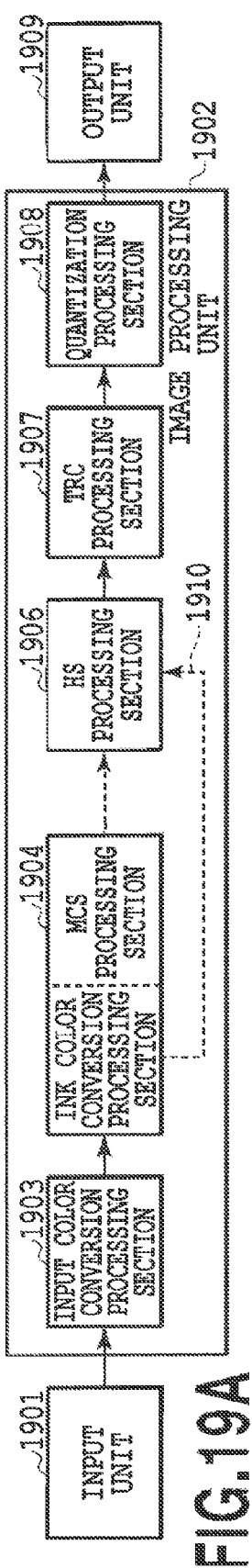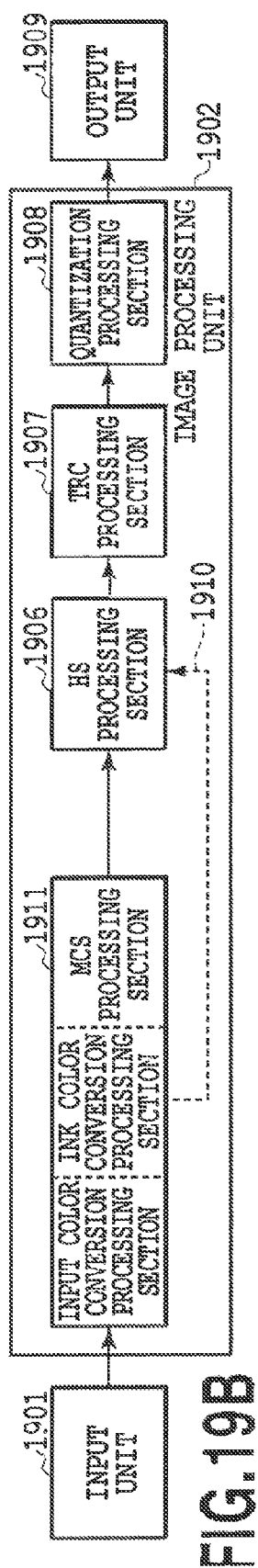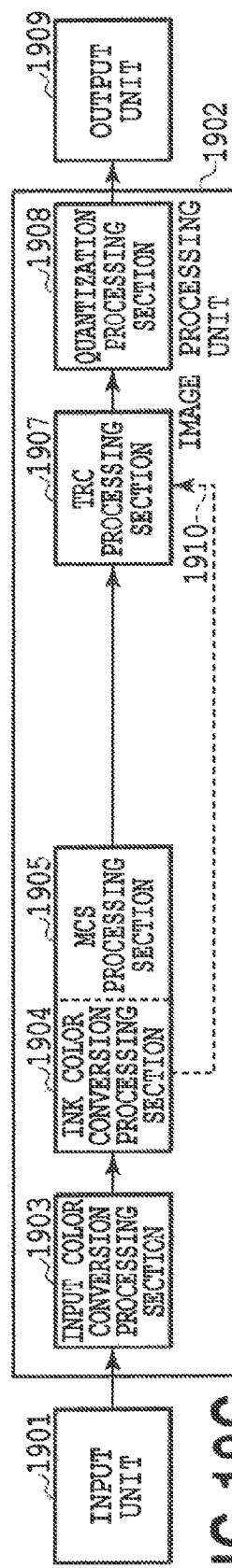

DATA PROCESSING APPARATUS AND DATA PROCESSING METHOD FOR REDUCING AN UNEVEN COLOR MADE UP OF TWO OR MORE INK COLORS

BACKGROUND OF THE INVENTION

1. Field of the Invention

The present invention relates to a data processing apparatus and data processing method that are used for image processing.

2. Description of the Related Art

A plurality of ink ejection nozzles, each being designed so as to eject the same ink volume, actually eject different ink volumes due to manufacturing variations. Accordingly, if the plurality of ejection nozzles are used to form an image on a print medium with the same number of dots, an even density may occur due to, for example, manufacturing variations.

In order to solve the problem of such an uneven density, Japanese Patent Laid-Open No. H10-013674 (1998) discloses a head-shading technique in which information on an ink volume ejected from each of ink ejection nozzles is obtained and on the basis of this information the number of print dots is changed.

The head-shading technique can solve the problem of an uneven density in each ink color by changing the number of print dots, but cannot solve the problem of an uneven color of a color formed by two or more ink colors due to an ink ejection volume of each of the ink ejection nozzles.

SUMMARY OF THE INVENTION

The present invention has an objective to reduce an uneven color of a color formed by two or more ink colors due to manufacturing variations of ink ejection nozzles and so on.

A data processing apparatus according to the present invention performs color correction processing on a color signal of each pixel of image data to be printed on a print medium using a print head, the color signal having a plurality of elements in a predetermined color space. The data processing apparatus includes a table generation unit configured to generate a plurality of correction tables assigned to each nozzle or each of a predetermined number of nozzles that are used for printing on a common region in the print medium in a plurality of nozzle arrays, respectively, the plurality of nozzle arrays being formed on the print head and ejecting a plurality of inks including a first ink and a second ink having a different color from the first ink, wherein, the table generation unit generates each of the plurality of correction tables on the basis of an ink ejection property of nozzles that eject at least the first and second inks.

Further features of the present invention will become apparent from the following description of exemplary embodiments (with reference to the attached drawings).

BRIEF DESCRIPTION OF THE DRAWINGS

FIGS. 4A to 4D are block diagrams illustrating configurations of an image processing unit in an ink jet printer according to a first embodiment and its variations of the present invention;

FIGS. 19A to 19C are block diagrams illustrating configurations of an image processing unit to generate print data according to a second embodiment and its variations of the present invention;

DESCRIPTION OF THE EMBODIMENTS

Embodiments of the present invention will be described with reference to drawings.

Figure 1:
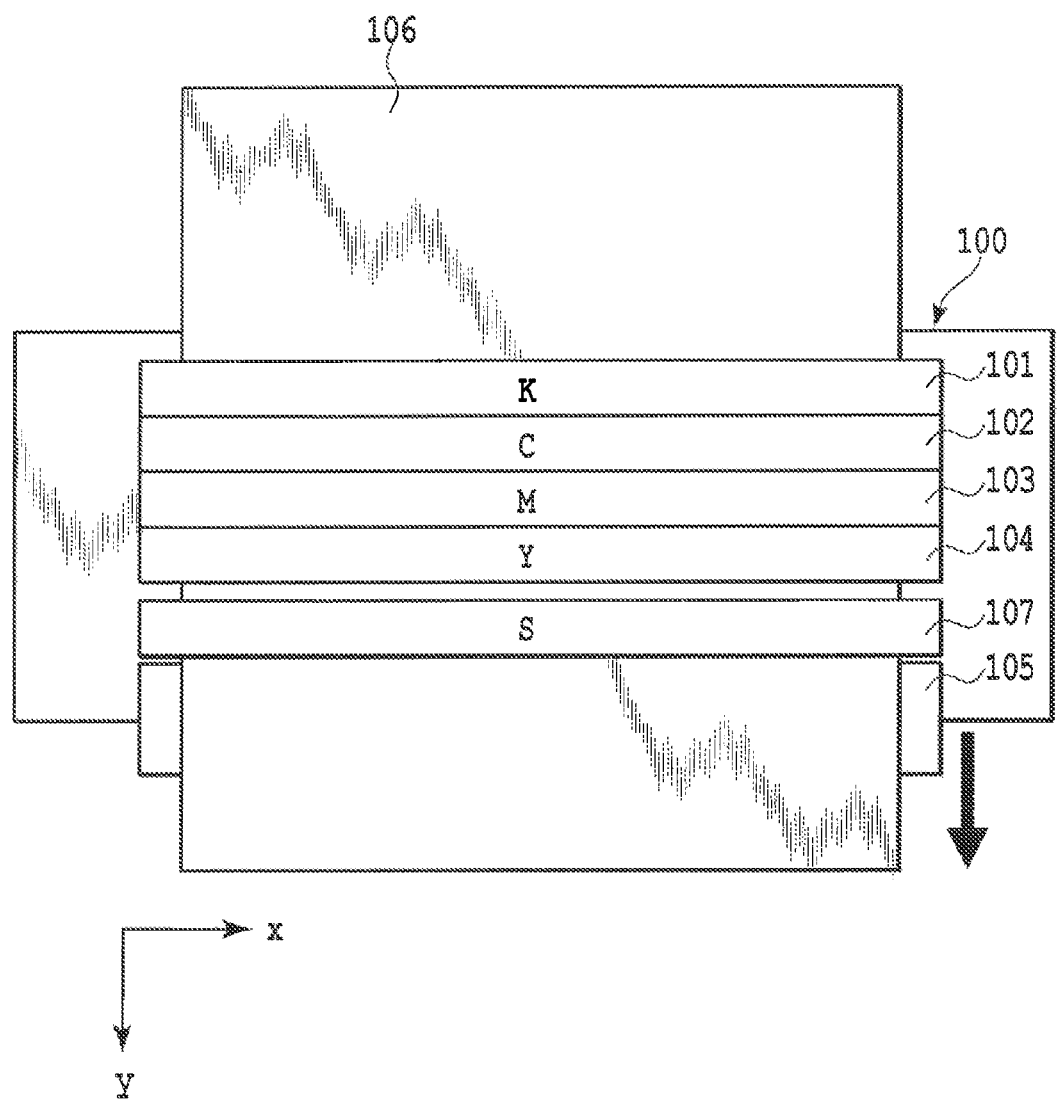
FIG. 1 is a schematic diagram of an ink jet printer according to one embodiment of the present invention.

FIG. 1 is a schematic diagram illustrating an ink jet printer according to one embodiment of the present invention. As illustrated in FIG. 1, a printer 100 has print heads 101 to 104 on a frame composing a constructional material of the printer. The print heads 101 to 104 are full-line type print heads, each having a plurality of nozzles for ejecting black (K), cyan (C), magenta (M), or yellow (Y) ink arranged over a width of a print paper 106. A resolution of nozzle arrangement of nozzle array of each color is 1200 dpi.

Figure 21:
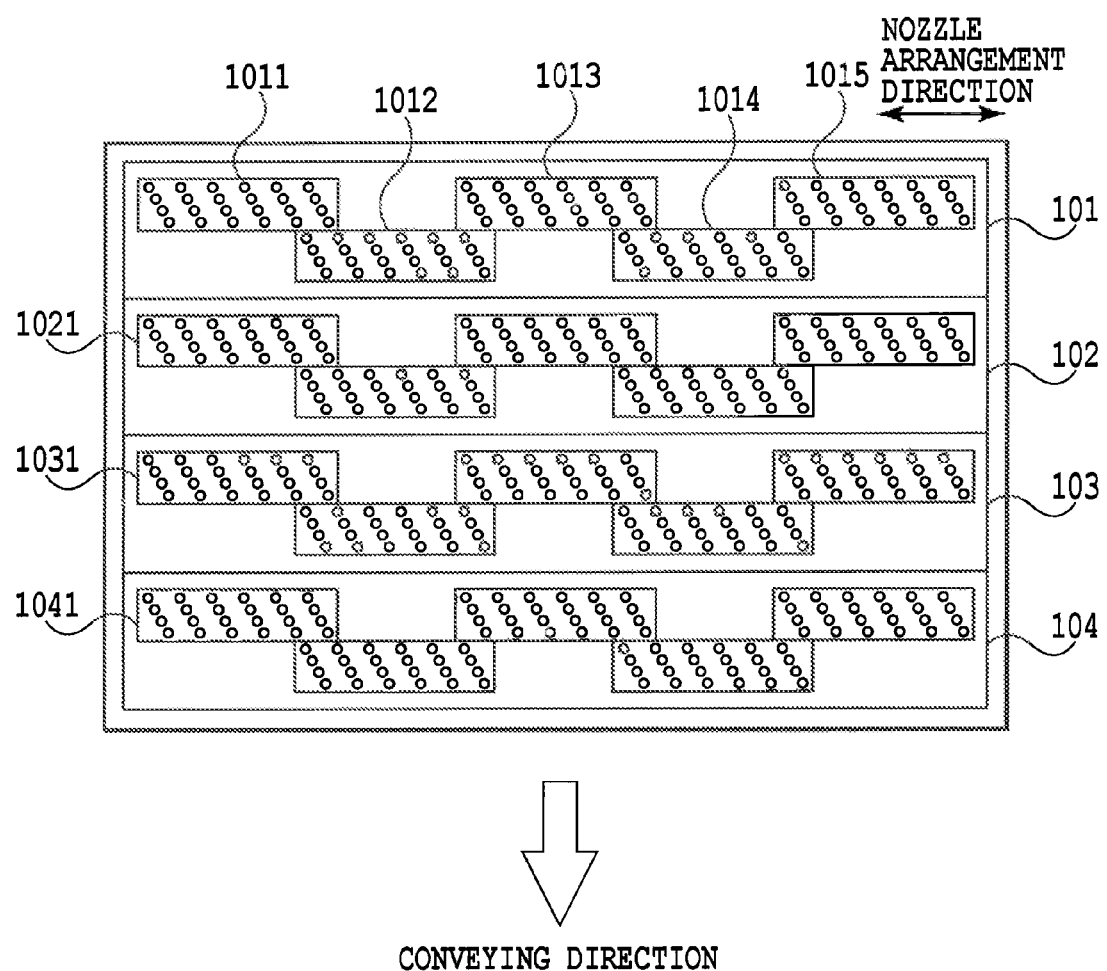
FIG. 21 is a schematic diagram showing the print heads 101 to 104 according to one embodiment of the present invention.

FIG. 21 is a schematic diagram showing the print heads 101 to 104 according to one embodiment of the present invention. Each of the print heads 101 to 104 has a plurality of ejection substrates which are arranged in order in the nozzle arrangement direction. The end portion of respective ejection substrates overlaps the end portion of the adjacent ejection substrate. The respective substrates have four nozzle arrays. For example, the print head 101 has ejection substrates 1011 to 1015 and the ejection substrates are arranged so as to be shifted in the nozzle arrangement direction as shown in FIG. 11. Further, the ejection substrate 1011 in the print head 101, the ejection substrate 1021 in the print head 102, the ejection substrate 1031 in the print head 103 and the ejection substrate 1041 in the print head 104 are arrayed in a direction (conveying direction) crossing the nozzle arrangement direction.

The print paper 106 as a print medium is conveyed in a direction of an arrow illustrated in FIG. 1 as a conveying roller 105 (and a roller that is not illustrated) is rotating by a driving force of a motor (not illustrated). While the print paper 106 is being conveyed, the plurality of nozzles of each of the print heads 101 to 104 eject ink according to print data thereby to sequentially print one raster of image corresponding to a nozzle array of each of the print heads. By repeating such an ink ejection operation from each of the print heads to a print paper that is being conveyed, one page of images, for example, can be printed. A printing apparatus that the present invention can be applied to is not limited to the full-line type apparatus as described above. It is obvious form the above description that the present invention can be applied to, for example, a serial-type printing apparatus in which printing is performed by scanning a print head in a direction intersecting with a conveying direction of the print paper.

Figure 2:
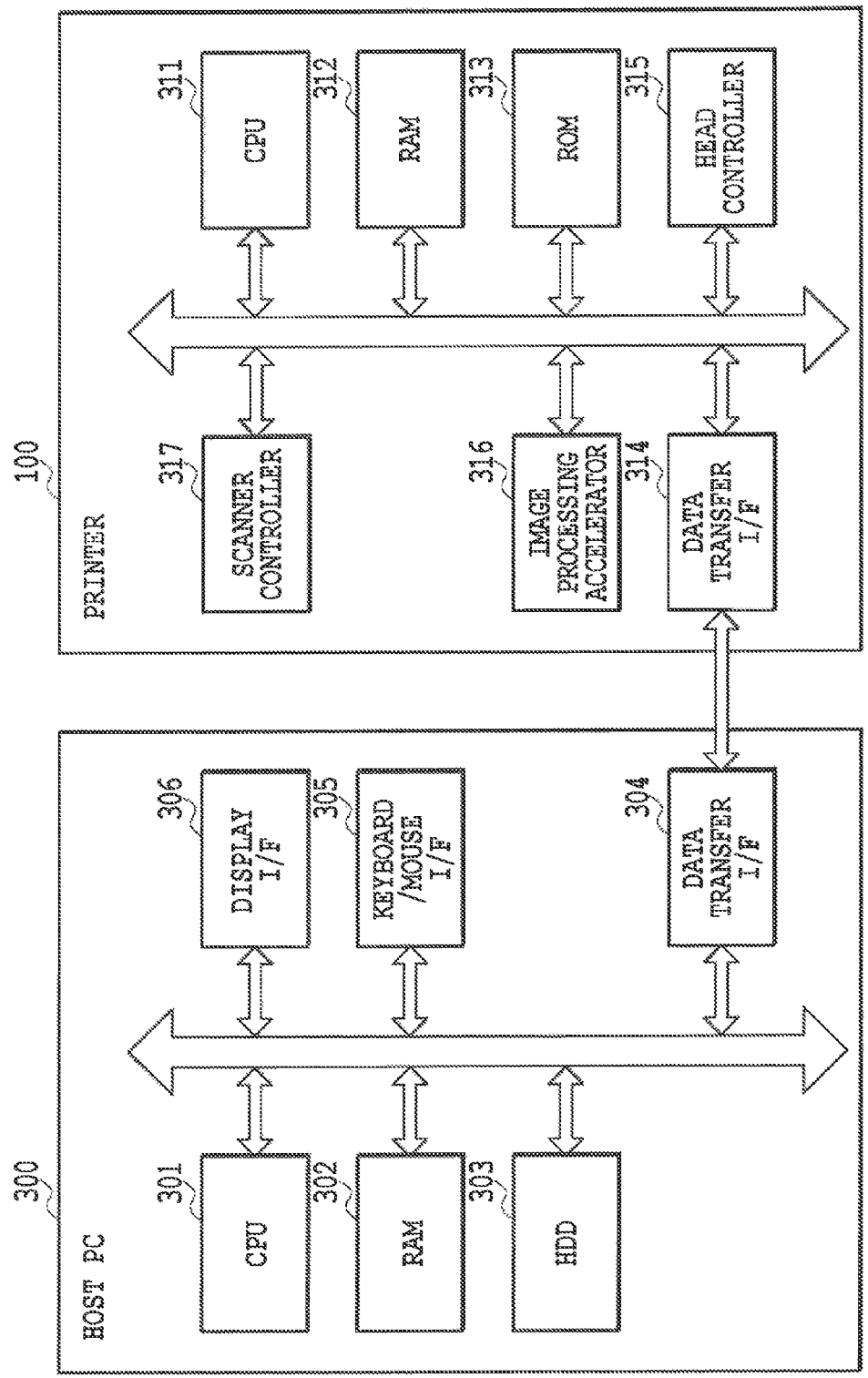
FIG. 2 is a block diagram illustrating a configuration of a print system according to one embodiment of the present invention.

FIG. 2 is a block diagram illustrating a configuration of a print system according to one embodiment of the present invention. As illustrated in FIG. 2, this print system is composed of the printer 100 illustrated in FIG. 1 and a personal computer (PC) 300 as a host apparatus.

The host PC 300 is composed mainly of the following components. A CPU 301 performs processing according to programs stored in an HDD 303 and a RAM 302. The RAM 302 is a volatile storage and temporarily stores a program and data. The HDD 303 is a nonvolatile storage and similarly stores a program and data. A data transfer interface (I/F) 304 controls sending and receiving data between the host PC 300 and printer 100. As a connection for sending and receiving data, USB, IEEE1394, LAN and so on can be used. A keyboard and mouse I/F 305 is an I/F that controls a human interface device (HID) such as a keyboard and a mouse, and a user can perform inputting through this I/F. A display I/F 306 controls displaying on a display (not illustrated).

The printer is composed mainly of the following components. A CPU 311 performs processing of each embodiment, which will be described with reference to FIG. 4A and its subsequent Figs., according to programs stored in a ROM 313 and a RAM 312. The RAM 312 is a volatile storage and temporarily stores a program and data. The ROM 313 is a nonvolatile storage and can store a program and table data generated in processing of each embodiment, which will be described with reference to FIG. 4A and its subsequent Figs.

A data transfer I/F 314 controls sending and receiving data between the printer 100 and PC 300. A head controller 315 supplies print data to each of the print heads 101 to 104 illustrated in FIG. 1 and controls an ejection operation of the print heads. Specifically, the head controller 315 can read a control parameter and print data from a predetermined address from the RAM 312. Then, when CPU 311 writes the control parameter and print data in the predetermined address of the RAM 312, the head controller 315 initiates processing and print heads eject ink. An image processing accelerator 316 is composed of hardware and performs image processing faster than the CPU 311. Specifically, the image processing accelerator 316 can read a parameter and data necessary for image processing from a predetermined address of the RAM 312. Then, when the CPU 311 writes the parameter and data in the predetermined address of the RAM 312, the image processing accelerator 316 is initiated to perform a predetermined image processing. According to the present embodiment, processing to generate a parameter of a table used in the MCS processing section will be performed by software in the CPU 311, which will be described with reference to FIG. 4A and its subsequent Figs. Meanwhile, image processing for printing including processing in the MCS processing section is performed by hardware processing in the image processing accelerator 316. The image processing accelerator 316 is not necessarily an essential component, and it is obvious that both of the table parameter generation processing and image processing may be performed by only processing by the CPU 311, depending on the specification of a printer.

Several embodiments for reducing a color shift caused by ink ejection volume variations among a plurality of nozzles when a plurality of types of inks are used to print an image in the printing system described above, will be described below. In a conventional head shading technique in which each of data formed by a plurality of different types of inks is individually corrected, if the plurality of different types of inks are overlapped to express a color, a color shift that the expressed color is different from the intended color may occur.

Figure 3A:
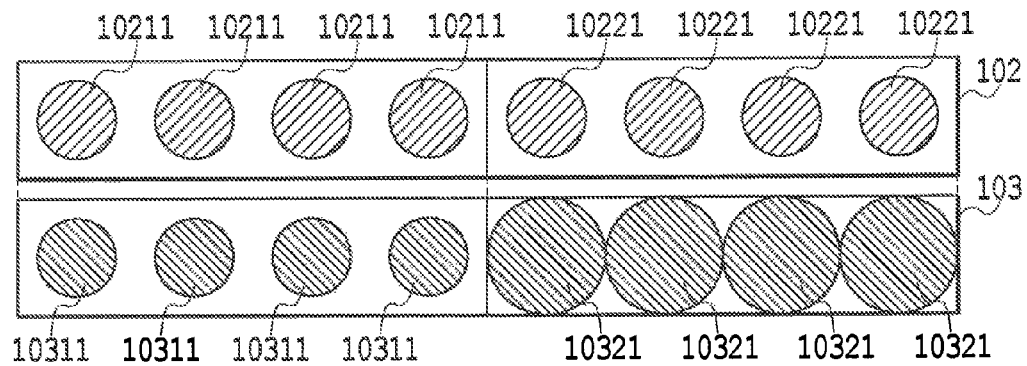
FIGS. 3A to 3C are diagrams illustrating occurrence of a color shift when a color is formed by overlapping a plurality of different inks.
Figure 3B:
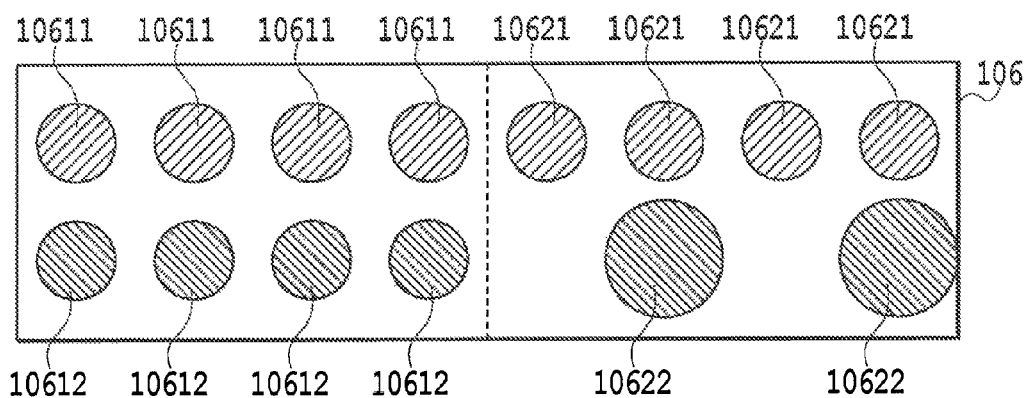
Figure 3C:
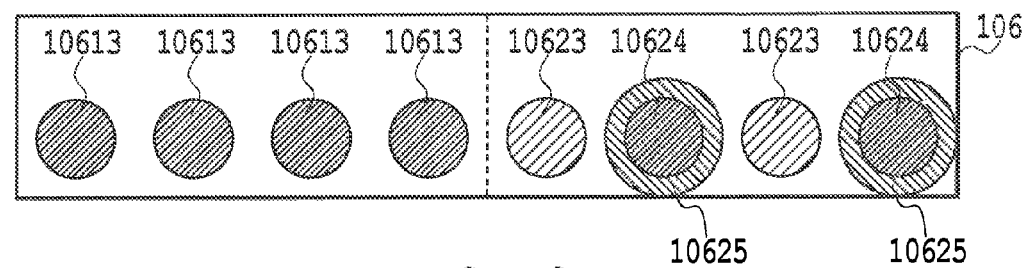

FIGS. 3A to 3C are diagrams illustrating this color shift. Here, an explanation will be made with reference to a portion of nozzles in the print heads 102 and 103 illustrated in FIG. 21. In FIG. 3A, 102 indicates the print head that ejects a cyan ink and 103 indicates the print head that ejects a magenta ink. In order to simplify description and illustration, FIG. 3A illustrates only eight nozzles of a plurality of nozzles of each of the print heads, and illustrates only two print heads by way of example in order to describe a color shift that may occur when blue is printed by cyan and magenta inks.

In FIG. 3A, eight nozzles 10211, 10221 of the cyan ink print head 102 all have a normal ejection volume. Meanwhile, four nozzles 10311 on the left of eight nozzles of the magenta print head 103 in FIG. 3A have a normal ejection volume, but four nozzles 10321 on the right of them in FIG. 3A all have a larger ejection volume than the normal ejection volume. The four nozzles on the right of the magenta ink print head 103 illustrated in FIG. 3 all are illustrated to have a larger size than the four nozzles on the left, which is for easier understanding of the difference of their ejection volumes, not for illustrating the actual difference of their nozzle sizes.

When a print head having such an ejection volume characteristic is used, if image data is corrected by a conventional head shading, binary data (dot data) corresponding to a nozzle can be eventually obtained. If these cyan and magenta dot data were individually printed on the print paper 106 without overlapping, they would be printed as illustrated in FIG. 3B. FIG. 3B illustrates dots printed in such a way that a solid image, that is, image data in which both of cyan and magenta are 100% duty, is subjected to head shading processing, and then is subjected to binarization processing, and printed.

FIG. 3B illustrates cyan dot data 10611, 10621 corresponding to the nozzles of the cyan ink print head 102 and magenta dot data 10612, 10622 corresponding to the nozzles of the magenta ink print head 103. Dot data 10622 in a region corresponding to the four nozzles 10321 with a larger ejection volume of magenta ink, image data of the corresponding region is corrected by head shading, thereby reducing the number of dot data. FIG. 3 illustrates an example in which an area of a dot formed by ink ejected from magenta ink nozzles 10321 with a larger ejection volume is twice as large as an area of a dot formed by ink with a normal ejection volume. In this case, the number of dot data is reduced by half (from four dots to two dots) by correction of head shading. The number of dot data is reduced by half when an area of a dot doubles in order to simplify description. Needless to say, the number of dot data is actually set so that the increase (decrease) of density caused by increase (decrease) of an area of a dot due to ink ejection volume variations can be suppressed and as a result a normal density can be obtained.

FIG. 3C illustrates an example in which, on the basis of dot data obtained as described above, cyan and magenta inks are ejected from the respective print heads on the print paper 106 thereby to print a blue image. In a region on the left in FIG. 3C of the print paper 106, standard-size blue dots 10613, which are formed by overlapping of cyan and magenta inks, are printed. Meanwhile, in a region on the right in FIG. 3C corresponding to four nozzles 10321 with a larger ejection volume of a magenta ink, the following dots are printed: standard-size cyan dots 10623, as well as dots, each being composed of a blue area 10624 formed by overlapping cyan and magenta inks and a magenta area 10625 surrounding the blue area 10624.

In this way, the region for printing a blue (solid image) on the right in FIG. 3C corresponding to magenta nozzles 10321 with a larger ejection volume is composed of the following three types of dots or areas:

two standard-size cyan areas (dots) 10623 two standard-size blue areas 10624, each of which is a standard-size cyan dot formed within a magenta dot larger than the standard size two magenta areas 10625, each of which surrounds the standard-size blue area 10624

Here, as described above, in a conventional head shading method, each of cyan image data and magenta image data is individually corrected to adjust the number of dots of each of cyan and magenta. The result is an area of two cyan areas (dots) 10623=an area of two blue areas 10624=an area of two magenta areas 10625. In this case, it is assumed that a color on the whole observed by the optical absorption property of the cyan areas 10623 and the optical absorption property of the magenta areas 10625 is the same as a color observed by the optical absorption property of the blue areas 10624. At this time, this whole region has the same color of the blue areas 10624.

However, when an area such as the blue area 10624 is formed by overlapping of a plurality of different types of inks, a color observed by the optical absorption property of the area is often different from a color observed by combining the optical absorption properties of the respective areas of the plurality of inks. As a result, a color in the whole region shifts from an intended standard color, and therefore a blue image on the left half region in FIG. 3C appears to have a different color from the color of a blue image on the right half region in FIG. 3C in the print paper 106.

Also in a multiple-valued printing apparatus in which the size of dots are variable, such as a quarternary printing apparatus that performs printing with three sizes of dots, that is large, medium and small dots, the dimensions of dots of the respective sizes often vary due to ink ejection volume variations among nozzles. Also in this case, even if correction by conventional head shading is performed, a color shift may happen due to the same reason as above. Therefore, the present invention can also be applied to a binary printing apparatus, as well as a multi-valued printing apparatus such as ternary and more-valued printing apparatuses.

In each embodiment of the present invention that will be described below, a correction table to be used in an image processing process for reducing the aforementioned color shift is formed by subjecting image data composed of a plurality of sets of color signals before quantization to correction processing.

First Embodiment

FIG. 4A is a block diagram illustrating a configuration of an image processing unit of an inkjet printer according to a first embodiment of the present invention. That is, in the present embodiment, the image processing unit is composed of components for control of the printer 100 illustrated in FIG. 2 and image processing. It should be appreciated that application of the present invention is not limited to this configuration. For example, the image processing unit may be configured in the PC 300 illustrated in FIG. 2, or part of the image processing unit may be configured in the PC 300 and the other part thereof may be configured in the printer 100.

As illustrated in FIG. 4A, an input unit 401 inputs image data sent from the host PC 300 and passes the data to an image processing unit 402. The image processing unit 402 processes a color signal in a process of converting the input image data to a signal that can be printed by the print head. This image processing unit 402 has an input color conversion processing section 403, a multi color shading (MCS) processing section 404, an ink color conversion processing section 405, and a head shading (HS) processing section 406. The image processing unit 402 further has a tone reproduction curve (TRC) processing section 407 and a quantization processing section 408. The ink color conversion processing section composes a second conversion means.

In the image processing unit 402, first, the input color conversion processing section 403 converts image data inputted from the input unit 401 to image data corresponding to a color reproduction zone of a printer. The inputted image data is data showing color coordinates (R, G, B) within a color space coordinate, such as RGB, that are expression colors of a monitor in the present embodiment. The input color conversion processing section 403 converts each of the input eight-bit image data R, G, B to image data (R', G', B') of the color reproduction zone of the printer by a known method such as matrix operation processing and processing using a three-dimensional lookup table. The image data (R', G', B') is a color signal composed of three elements. In the present embodiment, conversion processing is performed using a three-dimensional lookup table together with interpolation operation. Eight-bit image data dealt with in the image processing unit 402 has a resolution of 600 dpi, and binary data obtained by quantization in the quantization processing section 408 has a resolution of 1200 dpi, as will be described.

The multi color shading (MCS) processing section 404 performs correction processing on image data (a first color signal) converted by the input color conversion processing section 403, thereby converting the image data to a second color signal. This processing is also performed using a three-dimensional lookup table (correction table), as will be described later. The three-dimensional lookup table is composed of a color cube of a color signal composed of three elements. This correction processing can reduce the color shift even if there are ejection volume variations among the nozzles of the print head of an output unit 409. A specific table content on this MCS processing section 404 and correction processing using this table will be described later.

The ink color conversion processing section 405 converts each of R, G, B eight-bit image data processed by the MCS processing section 404 to image data that is ink color signal data to be used in the printer. Since the printer 100 of the present embodiment uses black (K), cyan (C), magenta (M) and yellow (Y) inks, image data of the RGB signal is converted to image data composed of eight-bit color signals K, C, M, Y. This color conversion is also performed using a three-dimensional lookup table together with interpolation operation, as with the aforementioned input color conversion processing section. As another conversion method, matrix operation processing may be used, as with the above.

The head shading (HS) processing section 406 inputs image data of an ink color signal, and converts the imputed eight-bit image data to image data of an ink color signal corresponding to an injection volume of each of the nozzles of the print head by each ink color. That is, this processing is the same as the aforementioned conventional head shading processing. In the present embodiment, this HS processing is performed using a first-dimensional lookup table. When the present invention is applied, this HS processing section may not be provided if not otherwise specified. That is, there are cases where the accuracy of correction processing by the MCS processing section is sufficient relative to memory capacity, depending on the specification of a printer. In such cases, processing by the HS processing section can be covered by the correction processing in the MCS processing section.

The tone reproduction curve (TRC) processing section 407 performs correction on the image data composed of the eight-bit ink color signals that were subjected to HS processing thereby to adjust the number of dots to be printed by the output unit 409 for each ink color. That is, there are cases where a relationship between the number of dots to be printed on a print medium and a brightness realized by the number of dots is not linear. The TRC processing section 407 corrects the eight-bit image data so as to make this relationship linear, adjusting the number of dots to be printed on the print medium.

The quantization processing section 408 performs quantization processing on the image data composed of the respective eight-bit (256 values) ink colors processed in the TRC processing section 407 to obtain one-bit binary data. In doing so, according to the present embodiment, the eight-bit data is first converted to three-bit, 5-valued index data of "0" to "4" for each color. This index data "0" to "4" corresponds to a pattern in which zero to four dots are arranged in 2×2 pixels at a resolution of 1200 dpi. It should be appreciated that a mode of quantization 408 is not limited to this mode in applying the present invention. For example, eight-bit image data may be directly binarized to obtain binary data (dot data). As a method for quantization processing, the present embodiment uses an error diffusion method, but other pseudo halftone processing such as a dither method may be used.

The output unit 409 drives the print head to eject each color ink to perform printing on the print medium on the basis of the dot data (signals that can be printed) obtained by quantization. The output unit 409 specifically is composed of a printing mechanism having the printing heads 101 to 104 illustrated in FIG. 1.

Figure 22A:
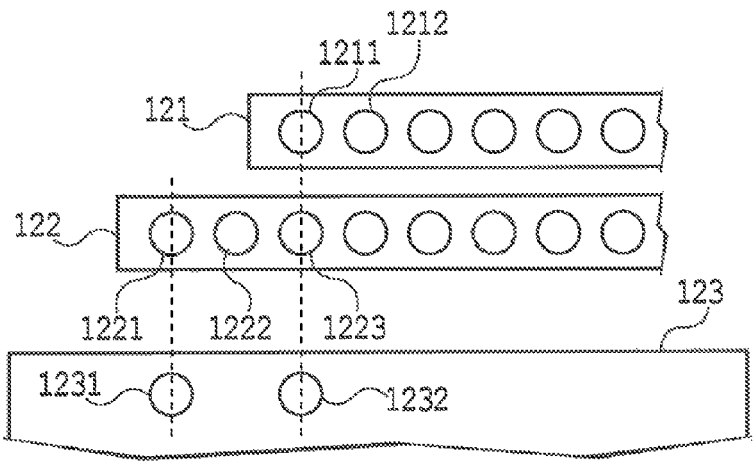
FIGS. 22A to 22C are views for illustrating a positional error correction of an ejection substrate of a print head according to one embodiment of the present invention.
Figure 22B:
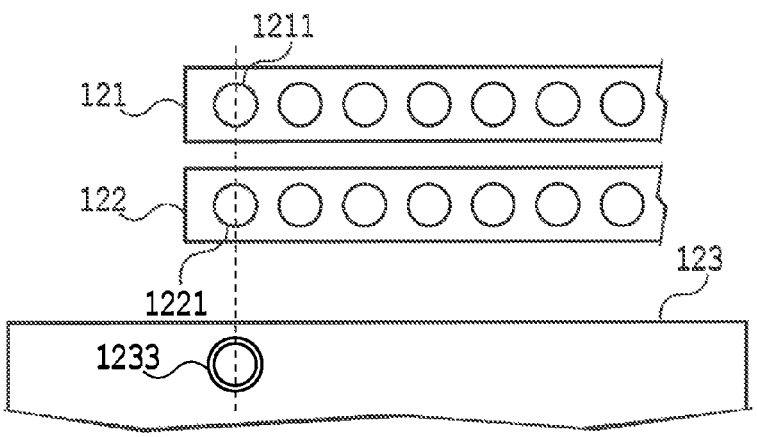
Figure 22C:
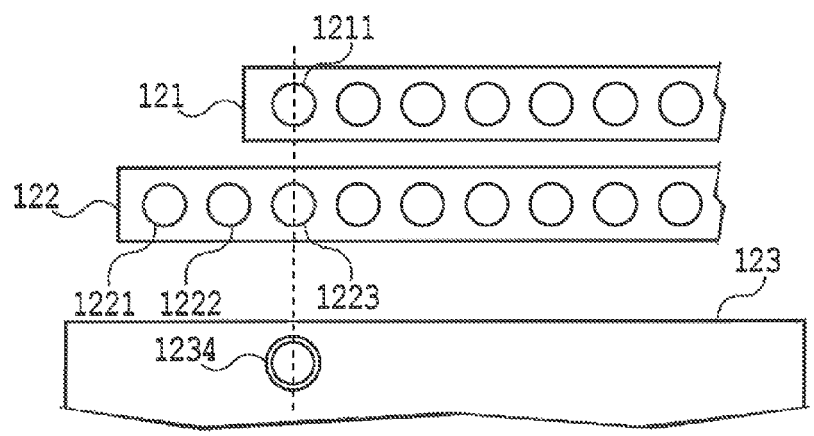

Next, FIGS. 22A to 22C are used to describe a position displacement correction of a printing head in the nozzle array direction, which is made before the MCS processing. As will be described later, the MCS processing is processing that, for each unit area on the printing medium, uses a conversion table to convert image data corresponding to a nozzle that performs printing in each unit area. This enables a color difference between unit areas due to an ejection amount variation between nozzles to be reduced. In order to perform the MCS processing, the conversion table should be created for each type of data corresponding to a nozzle group corresponding to a unit area; however, at the time of the creation, which nozzle corresponds to each unit area should be already set. That is, before the MCS processing is performed, a correspondence between each unit area on the printing medium and a nozzle should be assigned.

The correspondence between each unit area and a nozzle is, in consideration of an influence of an error at the time of attaching a printing head, or attaching an ejecting board to the printing head, determined with the printing head being attached to the printer. This is because if the printing head is displaced in the nozzle array direction, a nozzle that performs printing in each unit area is changed. In such a case, a so-called "position displacement correction" that corrects a displacement between a position on the printing medium and a nozzle used for printing is made. When the position displacement correction is made, it should be made before the creation of a conversion table that converts image data corresponding to a nozzle that performs printing in each unit area.

FIGS. 22A to 22C are used to describe a position displacement correction method. FIG. 22A illustrates a state where when a plurality of printing heads that eject different inks are attached, position displacement in the nozzle array direction occurs. In the diagram, the "position displacement correction" is not made. In the diagram, a printing head 121 that ejects a cyan ink, and a printing head 122 that ejects a magenta ink are displaced each other in the nozzle array direction (left-right direction in the diagram) by an amount corresponding to two nozzles. In this case, if the inks are ejected from end nozzles of the respective printing heads to thereby attempt to form a blue color dot, because the position displacement occurs between the printing heads, a cyan dot 1231 ejected from a cyan nozzle 1211 that is the end nozzle, and a magenta dot 1232 ejected from a magenta nozzle 1221 are not overlapped, and therefore the blue color dot cannot be formed.

FIG. 22B is a schematic diagram for describing a method for making the position displacement by adjusting positions of the printing heads in the printer in the nozzle array direction. By physically aligning the printing head 121 and the printing head 122 with each other, the adjustment is made so as to align the cyan nozzle 1211 and the magenta nozzle 1221 with each other with respect to the conveying direction of the printing medium to thereby overlap the dots. Based on this method, the cyan dot ejected from the cyan nozzle 1211 and the magenta dot ejected from the magenta nozzle 1221 are land on the same position, and thereby a blue dot 1233 can be formed. This method is one that uses a screw or the like for an alignment reference to mechanically adjust attachment positions of the printing heads with respect to the printer.

FIG. 22C is a schematic diagram for describing a method for making the position displacement by correcting image data distributed to each nozzle of the printing heads. In this method, when the image data are allocated to the respective printing heads, nozzles to which the image data for forming the respective color dots to be arrayed to the same position in the nozzle arrangement direction are allocated are changed to the nozzles which are arrayed in the same position in the nozzle arrangement direction. In the case of the diagram, a change is made such that image data allocated to the magenta nozzle 1221 of the printing head 122 in FIG. 22A are allocated to a magenta nozzle 1223. Based on this method, the cyan dot ejected from the cyan nozzle 1211 and a magenta dot ejected from the magenta nozzle 1223 land on the same position, and thereby a blue dot 1234 is formed. Similarly, for the other nozzles, image data to be allocated are displaced in the nozzle array direction by the amount corresponding to two nozzles, and thereby corrections can be made.

As described above, in the case of position displacement between printing heads, the method that adjusts positions of the printing heads in the nozzle array direction to thereby align nozzles, and the method that a nozzle to which image data are allocated is changed to a nozzle aligned in the conveyance direction are known. Based on any of these methods, a placement position displacement occurring when a plurality of printing heads for different ink colors are displaced each other in the nozzle arrangement direction can be corrected.

By making such a position displacement correction, a correspondence relationship between nozzles corresponding to each unit area is set. As described above, the MCS processing that is a feature of the present invention should be performed with the correspondence between each unit area on the printing medium and a nozzle being set. If a position in the conveying direction is not displaced, it is not necessary to make the position displacement correction; however, in the case of making the position displacement correction, the position displacement correction should be made at timing before the MCS processing to make alignment. Note that the position displacement correction method is not limited to any of the above two methods, but may be any other method if the method includes a process for setting the correspondence relationship between a unit area and a nozzle.

Figure 5A:
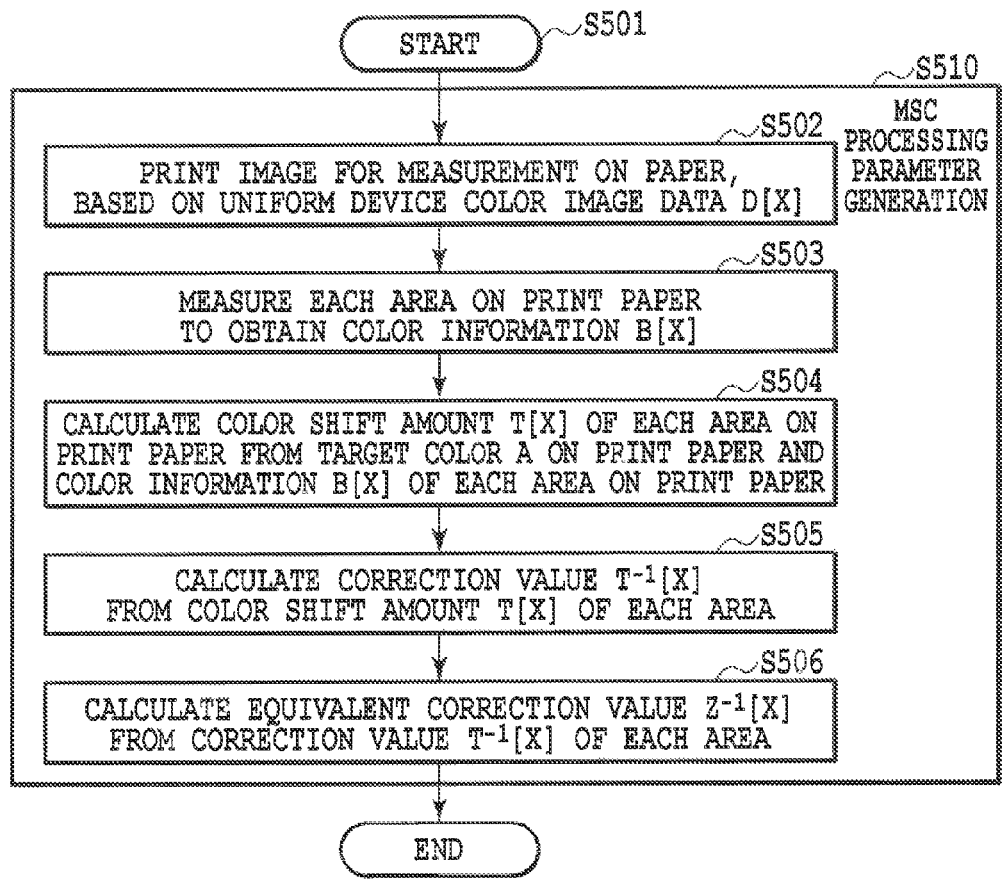
FIGS. 5A and 5B are flow charts, illustrating processing to generate parameters of a table used in an MCS processing section 404 illustrated in FIG. 4A and processing by the MCS processing section 404 using the table in image processing for generating print data, respectively.
Figure 5B:
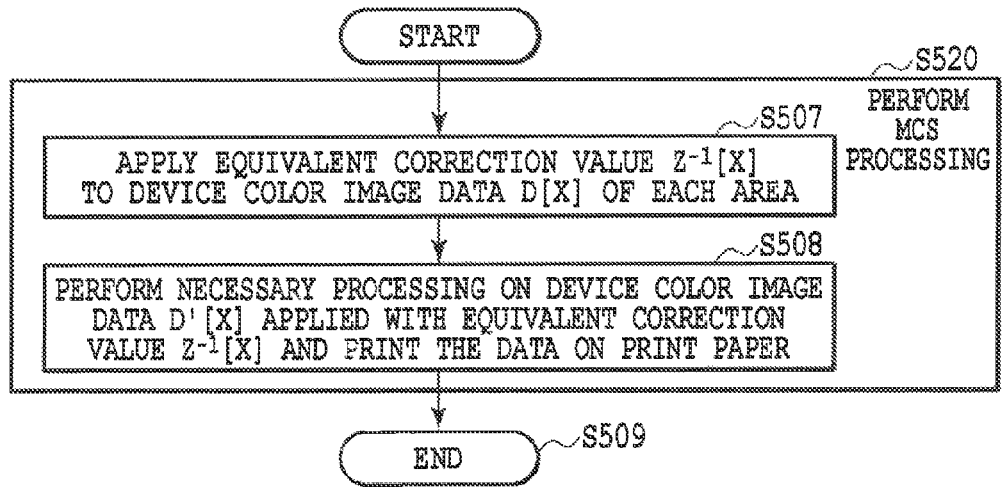

FIGS. 5A and 5B are flow charts illustrating data processing for generating parameters of a table to be used by an MCS processing section 404 illustrated in FIG. 4A and processing by the MCS processing section 404 using the table in image processing for generating print data, respectively.

In FIG. 5A, processing S510 generates parameters of a three-dimensional lookup table to be used by the MCS processing section 404 and has processes in Steps S502 to S506. In the present embodiment, the processing S510 is performed when a printer is manufactured, has been used for a predetermined period, or has performed a predetermined amount of printing. That is, the processing S510 also can be performed as calibration, which updates table parameters that are the content of the lookup table. Processing S520 illustrated in FIG. 5B is performed by the MCS processing section 404 when printing is performed by a printer, which is part of image processing performed by the image processing unit 402 illustrated in FIG. 4A in order to generate print data. This processing has processes in Steps S507 and S508. It should be appreciated that a timing for performing generation processing of table parameters is not limited to the aforementioned timing in applying the present invention. For example, the generation processing may be performed before the processing S520 for printing is performed.

First, processing S510 to generate table parameters illustrated in FIG. 5A will be described.

In the present embodiment, after table parameters for the HS processing section 406 are generated, table parameters for the MCS processing section are generated. Therefore, at the time point of Step S501 on which this processing is started, table parameters for the HS processing unit have been already generated (updated). In this generation of table parameters in the HS processing section, it is assumed that there are ejection volume variations among the nozzles of the magenta ink print head 103 illustrated in FIG. 3A. Table parameters corresponding to the print head 103 are parameters illustrated in FIG. 3B, which, in other word, the parameters for performing correction so that the number of dot data in a region corresponding to four nozzles 10321 on the right half is half the number of dot data in a region corresponding to four nozzles 10311 on the left half, as illustrated in FIG. 3B. If each nozzle of the cyan ink print head 102 has an ejection property illustrated in FIG. 3A, that is, if all the nozzles have a normal ejection volume, table parameters for the HS processing section are parameters so as to convert image data as what it is. In this way, according to the present embodiment, when table parameters for the MCS processing section are generated or updated, the table parameters for the HS processing section are generated prior to this. This can properly reduce a color shift due to the variations among nozzles by total processing of the MCS processing section and HS processing unit.

First, in Step S502, for each set of R, G, B representing a color whose color shift tends to be large of image data represented by a set of R, G, B to be inputted to the MCS processing section, ink is ejected from all the nozzles of the print head illustrated in FIG. 1, thereby printing an image for measurement (patch) on a print medium. Specifically, 0 to 255 of each of R, G, B are divided by, e.g. 17 to obtain values; grid points whose color shift tendency is significantly changing are selected from grid points set by combinations of the obtained values; and an image for measurement is printed for sets of R, G, B corresponding to these grid points. This grid point of a color whose color shift tendency is large can be selected from the grid points set by combinations of the values obtained by dividing by 17 by previously knowing a color whose color shift is significant, such as a set of R=0, G=0, B=255 corresponding to a blue image described with reference to FIGS. 3A to 3C. It should be appreciated that selecting grid points of a color for printing an image for measurement is not limited to the above example. For example, sets of R, G, B whose color shift is larger than a predetermined color shift may be set, and images for measurement may be printed for all of these sets. In other words, sets of color signals for printing an image for measurement can be set depending on an operation load and a memory capacity.

According to the present embodiment, in each of data of an image for measurement set as described above, a resolution of a plurality of pixels composing the data is 600 dpi. In the data of the plurality of pixels, when sets of R, G, B values of data of the image for measurement are the same, the color is uniform. Image data of the image for measurement is eight-bit image data (hereinafter referred to as device color image data D[X]) that was subjected to processing by the input color conversion processing section 403 illustrated in FIG. 4A. The image data is inputted through a bypass processing path indicated by a dash line 410 in FIG. 4A to the ink color conversion processing section 405, without being subjected to processing by the MCS processing section 404. Specifically, the MCS processing section 404 performs correction processing on the device color image data D [X], using a table in which a correction amount indicated by a table parameter is zero. After that, the image data proceeds to the HS processing section 406, TRC processing section 407 and quantization processing section 408, and then is printed on the print paper 106 in the output unit 409. In this process, image data of the image for measurement is converted to image data of ink color signals by the ink color conversion processing section 405, and data having 100% cyan duty and 100% magenta duty that forms blue described above with reference to FIGS. 3A to 3C, can be obtained as one of the data of the image for measurement. That is, data of (K, C, M, Y)=(0, 255, 255, 0) is obtained as image data of the image for measurement. Then, the obtained data is subjected to processing by the HS processing section 406 and its subsequent processing, resulting in the image data for measurement composed of dot data illustrated in FIG. 3B. In the following description, generation processing will be described on only table parameters corresponding to grid points indicative of image data of this blue image for measurement, to simplify description.

In device color image data D[X], X is a value to specify pixels with a resolution of 600 dpi in image data for measurement. In other words, X is a value for specifying, as a unit of 300 dpi, a pixel region (hereinafter referred to as area) corresponding to contiguous four nozzles in a nozzle arrangement of each ink color print head illustrated in FIG. 1. Accordingly, since a resolution of dots printed corresponds to the resolution of the nozzle arrangement and is 1200 dpi, two pixels of the image data D [X] having a 600 dpi resolution corresponds to one of the aforementioned area and is specified as X. As described above, this device color image data D[X] is subjected to processing by the ink color conversion processing section 405 and it subsequent processing, and the image for measurement of the data is printed in the output unit 409.

Figure 6A:
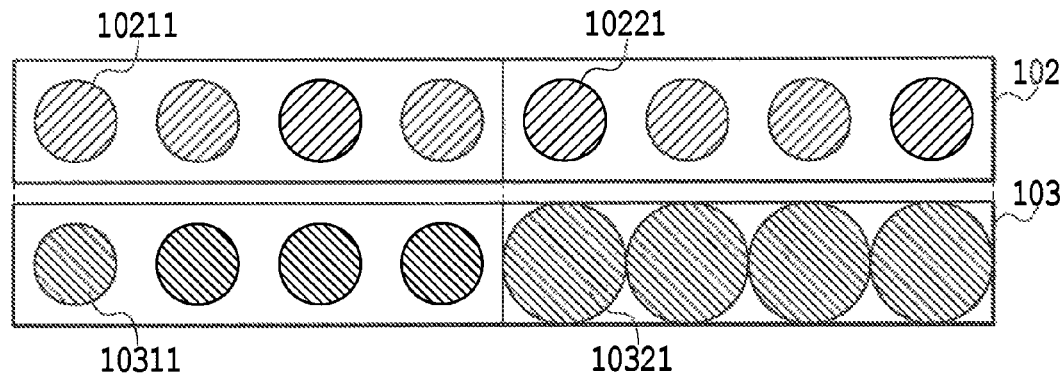
FIGS. 6A and 6B are diagrams illustrating printing of an image for measurement in Step S502 in FIG. 5A.
Figure 6B:
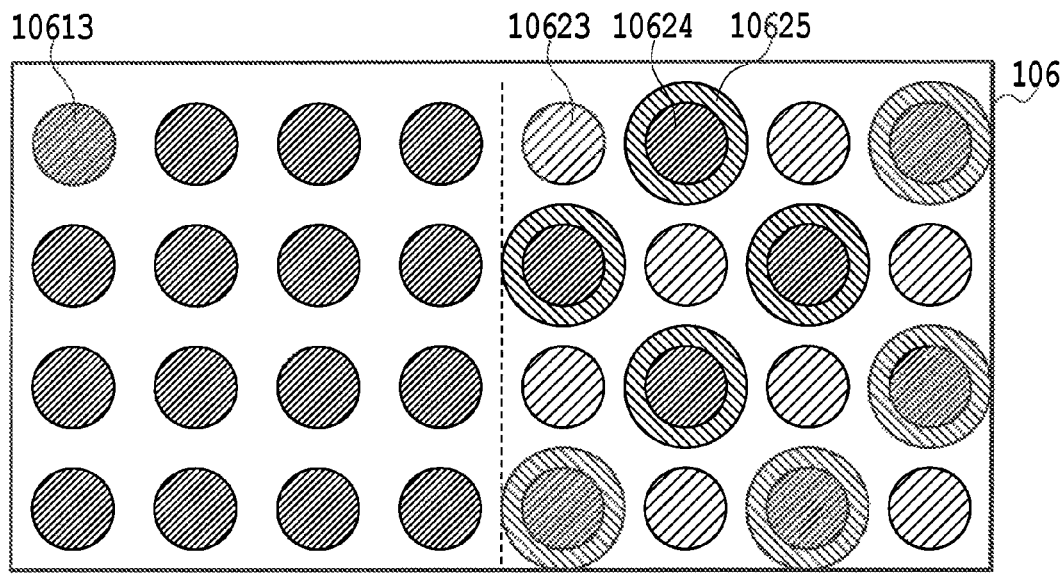

FIGS. 6A and 6B are diagrams illustrating printing of an image for measurement in Step S502. In FIGS. 6A and 6B, elements identical to those illustrated in FIGS. 3A to 3C have the same reference characters and will not be described.

FIG. 6A, as with the example illustrated in FIG. 3A, illustrates an example in which four nozzles on the right in FIG. 6A of nozzles of the magenta print head 103 have a larger ejection volume than a normal ejection volume. In this case, a blue image for measurement illustrated in FIG. 6B is printed. That is, an image for measurement is printed in which a region on the right in FIG. 6B has a color shift and the blue of the region is different from the blue on the left region in FIG. 6B.

Returning to FIG. 5A, in the next Step S503, as described above, the color of an image for measurement printed on the print paper 106 is measured to obtain color information B[X]. According to the present embodiment, the printer illustrated in FIG. 1 includes a scanner 107 that measures the image for measurement. Accordingly, this processing in Step S503 includes receiving the data measured by the scanner. Alternatively, a scanner separate from a printer may be used to perform measurement by operation of a user. The scanner and printer may be connected by signals and the measurement results may be automatically inputted from the scanner to the printer, for example. In the present embodiment, color information B[X] is represented by sets of RGB values read by the scanner. However, any data format, such as L*a*b* measured by a calorimetric device, can be used.

In the present embodiment, the resolution of the aforementioned measurement is 600 dpi. Meanwhile, the resolution of printed dots is 1200 dpi that corresponds to the resolution of the nozzles. Accordingly, in the aforementioned color measurement, a region corresponding to four nozzles illustrated in FIG. 6B is measured as two pixels. Then, the color information B[X] is obtained as a unit of a region corresponding to the two pixels of the measurement (the aforementioned area). That is, in the color information B[X], X is a value to specify an area, and is obtained as an average value of the measurement results of the two pixels of the measurement. In the example illustrated in FIG. 6B, in such a way that an area corresponding to four nozzles on the left side and an area corresponding to four nozzles on the right side are deemed to be different areas, the color information B[X] is obtained for each of the areas.

In this way, a blue image for measurement of a grid point whose device color image data D[X] is (R, G, B)=(0, 0, 255) is printed by ejecting inks from all of the nozzles of the cyan and magenta print heads 102 and 103 illustrated in FIG. 1. Then, color information B[X] is obtained for an area unit corresponding to the four nozzles. FIG. 6B illustrates a portion of the area; hereinafter an area on the left in FIG. 6B will be referred to as a first area (X=1) and an area on the right in FIG. 6B will be referred to as a second area (X=2). Color information of the first area is set to B[1]=(R1, G1, B1) and color information of the second area is B[2]=(R2, G2, B2). An example illustrated on the right area in FIG. 6B illustrates a case where all four magenta nozzles have a larger ejection volume than a normal ejection volume. Naturally, there can be also a case where three of four nozzles may have a larger ejection volume than a normal ejection volume and remaining one has a normal ejection volume, for example. In this case, needless to say, the obtained value B[2] that is the color information of the second area is different from the aforementioned case.

Next, in Step S504 of FIG. 5A, a color shift amount T[X] of each area [X] is calculated from a target color A=(Rt, Gt, Bt) and the color information B[X] obtained in Step S503. Here, the target color A is color data obtained by measuring with a scanner an image printed by the respective color printing heads having a normal ejection volume in the output unit 409 on the basis of the same blue image data represented by (R, G, B)=(0, 0, 255). In the present embodiment, the resolution of the measured color data is 300 dpi, as described above. Therefore, also in processing to generate table parameters by the MCS processing section in the aforementioned Step S504 and the undermentioned Steps S505 and S506, data with a pixel resolution of 300 dpi is processed.

That is, a color shift amount T is represented as follows:

Color shift amount $T[1]=B[1]-A=(R1-Rt, G1-Gt, B1-Bt)$

Color shift amount $T[2]=B[2]-A=(R2-Rt, G2-Gt, B2-Bt)$

Here, the color shift amount T [1] is a difference between a blue color by overlapping a cyan ink having a normal ejection volume and a magenta ink having a normal ejection volume in an area on the left in the example of FIG. 6B and a blue color of the target color data A. Except for a measurement error, the color shift amount T[1] is ideally zero, that is, fulfills the relationship of R1=Rt, G1=Gt, B1=Bt.

Meanwhile, the color shift amount T[2] is a difference between a blue color by combination of a cyan ink having a normal ejection volume and a magenta ink having a larger ejection volume than a normal ejection volume on the right in the example of FIG. 6B and a blue color of the target color data A. For example, if the blue color observed by combination of a cyan area 10623 and a magenta area 10625 cyan has a stronger blue cast in comparison with the target blue color, the color shift amount T[2] is a color shift amount whose cyan color is large. That is represented by R2<Rt, G2=Gt, B2=Bt, for example.

Returning to FIG. 5A, in the next Step S505, a correction value $T^{-1}[X]$ is calculated from the color shift amount T[X] of each area [X]. In the present embodiment, an inverse transformation equation is simply used as follows:

$T^{-1}[X]=-T[X]$

Accordingly, a correction value of each area is:

Correction value $T^{-1}[1]=-T[1]=A-B[1]=(Rt-R1, Gt-G1, Bt-B1)$

Correction value $T^{-1}[2]=-T[2]=A-B[2]=(Rt-R2, Gt-G2, Bt-B2)$

Here, the correction value $T^{-1}[1]$ corresponds to an area on the left in FIG. 6B and is ideally zero. Meanwhile, the correction value $T^{-1}[2]$ corresponds to an area on the right in FIG. 6B and reduces cyan color in the aforementioned example. That is, in the case of R2<Rt, Rt−R2 is a positive value, which increases redness and reduces cyan color.

Next, in Step S506 of FIG. 5A, an equivalent correction value $Z^{-1}[X]$ is calculated from a correction value $T^{-1}[X]$ of each area [X]. That is, since a correction value $T^{-1}[X]$ is a correction value of blue color in a measurement color space, an equivalent correction value $Z^{-1}[X]$ is calculated on the basis of this correction value so that equivalent correction value $Z^{-1}[X]$ corrects a blue color in a device color space by the same amount of this correction value $T^{-1}[X]$. Here, the equivalent correction value $Z^{-1}[1]$ corresponds to an area on the left in FIG. 6B and is ideally zero. Meanwhile, an equivalent correction value $Z^{-1}[2]$ corresponds to an area on the right in FIG. 6B and reduces a cyan color.

If a measurement color space is identical to a device color space, the relationship is as follows:

$$Z^{-1}[1]=T^{-1}[1]=-T[1]=A-B[1]=(Rt-R1, Gt-G1, Bt-B1)$$

$$Z^{-1}[2]=T^{-1}[2]=-T[2]=A-B[2]=(Rt-R2, Gt-G2, Bt-B2)$$

However, they are not identical to each other in most cases. In these cases, color space conversion is performed. That is, if linear conversion can be performed between the both color spaces, a known method such as the following matrix conversion can be used.

$$Z^{-1}[1] = \begin{bmatrix} a1 & a2 & a3 \\ a4 & a5 & a6 \\ a7 & a8 & a9 \end{bmatrix} \times \begin{bmatrix} Rt-R1 \\ Gt-G1 \\ Bt-B1 \end{bmatrix} \quad [\text{Expression}]$$

$$Z^{-1}[2] = \begin{bmatrix} a1 & a2 & a3 \\ a4 & a5 & a6 \\ a7 & a8 & a9 \end{bmatrix} \times \begin{bmatrix} Rt-R2 \\ Gt-G2 \\ Bt-B2 \end{bmatrix}$$

Here, a1 to a9 are conversion coefficients for converting a measurement color space to a device color space. If linear conversion cannot be performed between the both color spaces, a known method such as a three-dimensional lookup table can be used to obtain the value as follows:

$$Z^{-1}[1]=F(Rt-R1, Gt-G1, Bt-B1)$$

$$Z^{-1}[2]=F(Rt-R2, Gt-G2, Bt-B2)$$

where F is a function for converting a measurement color space to a device color space. Conversion relationship of the lookup table is in conformity to the function F.

If the relationship between a correction value $T^{-1}[X]$ and an equivalent correction value $Z^{-1}[X]$ varies depending on a color, a known method such as a three-dimensional lookup table can be similarly used to obtain the value as follows:

$$Z^{-1}[1]=F(Rt, Gt, Bt)-F(R1, G1, B1)$$

$$Z^{-1}[2]=F(Rt, Gt, Bt)-F(R2, G2, B2)$$

where F is also a function for converting a measurement color space to a device color space.

In this way, for a grid point selected as a color whose color shift tendency is significantly changing, a table parameter that is grid point data can be obtained for an area [X] corresponding to a nozzle. Table parameters of grid points other than the selected grid points can be obtained by interpolation between the selected grid points. As a method using interpolation, a well-known method can be used and will not be described.

An equivalent correction value $Z^{-1}[X]$ obtained as described above, which is a table parameter of each grid point, is associated with the grid point for each area [X] and stored in the HDD 303 (FIG. 2) of the host PC.

Next, processing S520 performed by the MCS processing section 404 illustrated in FIG. 5B will be described. That is, in a series of image processing by the respective processing sections illustrated in FIG. 4A, the MCS processing section 404 corrects image data using the three-dimensional lookup table for each area that has a correction value obtained as described above as grid point data.

First, in Step S507, an equivalent correction value $Z^{-1}[X]$ generated as above, which is a table parameter of the MCS processing section, is applied to device color image data D[X] thereby to perform correction.

In this step, first, it is determined which area of the aforementioned area [X] includes a pixel of interest to be subjected to image processing. Here, a pixel of image processing has a resolution of 600 dpi whereas an area [X] is specified by a resolution of 300 dpi. Accordingly, two pixels correspond to or belong to one area [X].

When X=n, a value of the area [X] that includes the pixel of interest is obtained, a set of R, G, B illustrated by image data of the pixel of interest and a table stored in the HDD 303 is referred to for the area [n] thereby to obtain an equivalent correction value $Z^{-1}[n]$ corresponding to the set of R, G, B and area. For example, if a set of R, G, B indicated by image data of a pixel of interest is (0, 0, 255) and represents a blue image, an equivalent correction value $Z^{-1}[n]$ of blue can be obtained as described above. Then, correction is performed by applying the equivalent correction value $Z^{-1}[n]$ to the image data of the pixel of interest.

Specifically, the MCS processing section 404 applies an equivalent correction value $Z^{-1}[X]$ to device color image data D[X] corresponding to an area [X] that a pixel of interest belongs to according to the following expression, thereby generating corrected device color image data D'[X]:

device color image data $D'[1]=D[1]+Z^{-1}[1]$ device color image data $D'[2]=D[2]+Z^{-1}[2]$ where $Z^{-1}[1]$ is a correction value corresponding to an area [1] on the left in the blue example of FIG. 6B and is ideally zero, as described above. Accordingly, the corrected device color image data D'[1] represents the same blue as the target color A. Meanwhile, $Z^{-1}[2]$ is a correction value corresponding to an area [2] on the right in the blue example of FIG. 6B and reduces cyan color, as described above. Accordingly, the corrected device color image data D'[2] represents blue whose cyan color has been reduced by correction relative to the target color A.

Next, in Step S508, the device color image data corrected as above proceeds through the ink color conversion processing section 405, HS processing section 406, TRC processing section 407 and quantization processing section 408 to the output unit 409, where the image data is printed on the print paper 106.

Figure 7A:
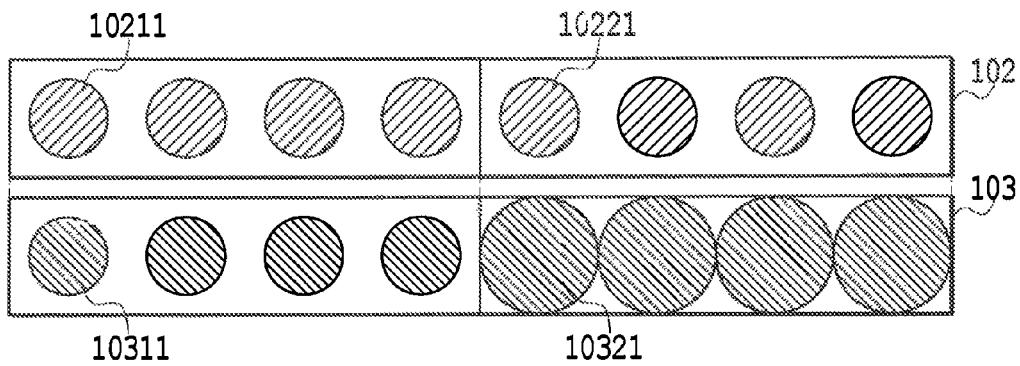
FIGS. 7A and 7B are diagrams illustrating an image printed in Step S508 in FIG. 5B.
Figure 7B:
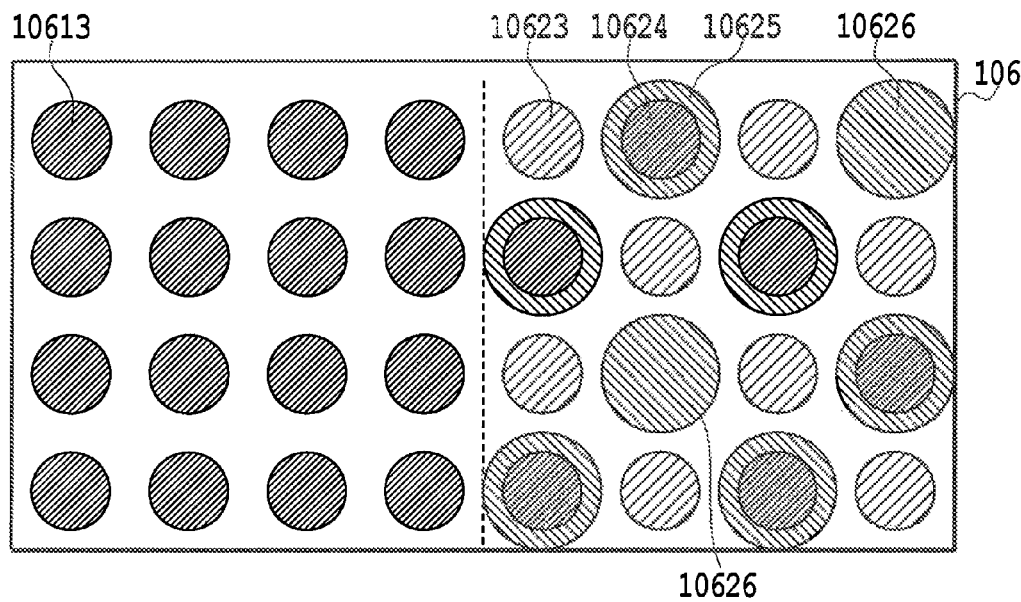

FIGS. 7A and 7B are diagrams illustrating an image printed in Step S508 of FIG. 5B. FIG. 7A, as with FIG. 6A, illustrates ejection volume properties of nozzles of the cyan print head 102 and magenta print head 103. When correction is performed on the image illustrated in FIG. 7A by the MCS processing, dots without overlapping of cyan dots, such as magenta dots 10626 in an area on the right in FIG. 7B exist.

That is, cyan dots were still printed on the magenta dots 10626 after HS processing in FIG. 6B. After MCS processing, a cyan color of image data D'[2] is reduced relative to the target color A, resulting in decrease of the number of the cyan dots.

Here, in each printing area illustrated in FIG. 7B, a color shift amount T[X] occurs due to ejection volume variations and so on in printing. That causes the following relationships:

color information of an area on the left≈color on print paper corresponding to D'[1]+T[1]≈A color information of an area on the right≈color on print paper corresponding to D'[2]+T[2]≈A where, D'[1] is ideally the same blue color as the target color A and T[1] is ideally zero. D'[2] is a blue color whose cyan color has been reduced by T[2] relative to the target color A, where T[2] is a color shift amount to increase a cyan color. In this way, the blue color of an area on the left and the blue color on an area on the right become almost the same, thereby reducing an uneven color due to a color shift.

As described above, in the present embodiment, for color (a set of R, G, B) whose color shift tendency is significantly changing, an image for measurement (patch) is printed on a print medium, and a table parameter is obtained on the basis of the measurement result. That is because a color shift amount that causes a color shift depends on both of (1) a color printed on a print region and (2) a combination of printing properties of respective colors to be printed on the print region, due to the principle of color shift occurrence. Here, (2) the printing properties of respective ink colors include factors that affect a dot diameter, such as a dot shape, an ink penetration rate and a print medium type, in addition to the ejection volume described above. It is obvious that a color shift amount depends on a combination of printing properties of ink colors used to print the color and does not depend on printing properties of inks that are not used. Accordingly, the type and number of ink colors varies depending on the color of a pixel of interest. Therefore, in some colors, only one ink color is involved and a color shift amount may not exist.

Here, by way of example, the case where a measurement color space is identical to a device color space will be described. For example, since a cyan mono-color (R=0, G=255, B=255) has already a uniform density after HS processing and does not have a color shift, it is preferable not to perform correction in the MCS processing section 404. Therefore, the equivalent correction value is preferably $Z^{-1}[1]=Z^{-1}[2]=0=(0, 0, 0)$. Since magenta mono-color (R=255, G=0, B=255) also has a uniform density after HS processing and does not have a color shift, it is preferable not to perform correction in the MCS processing section 404. Therefore, the equivalent correction value is $Z^{-1}[1]= Z^{-1}[2]=0=(0, 0, 0)$. Meanwhile, a blue color (R=0, G=0, B=255) has a high possibility of a color shift even if it is subjected to HS processing, as described with reference to FIGS. 3A to 3C. Therefore, in the example illustrated in FIG. 6B, an equivalent correction values are as follows:

equivalent correction value $Z^{-1}[1]=0=(0,0,0)$ equivalent correction value $Z^{-1}[2]=T^{-1}[2]=(Rt-R2, Gt-G2, Bt-B2)$ That is, even if the color signal value B is B=255, a color shift amount varies depending on a combination of other colors R, G and therefore a suitable equivalent correction value also varies.

In other words, in generating the table as described above, a grid point of a color whose color shift tendency is significantly changing is selected so that each grid point in the table has the aforementioned suitable equivalent correction value as grid point data. Then, the MCS processing section 404 uses a three-dimensional lookup table obtained on the basis of the measurement result of an image for measurement of a color of the grid point suitably selected as described above.

Figure 8:
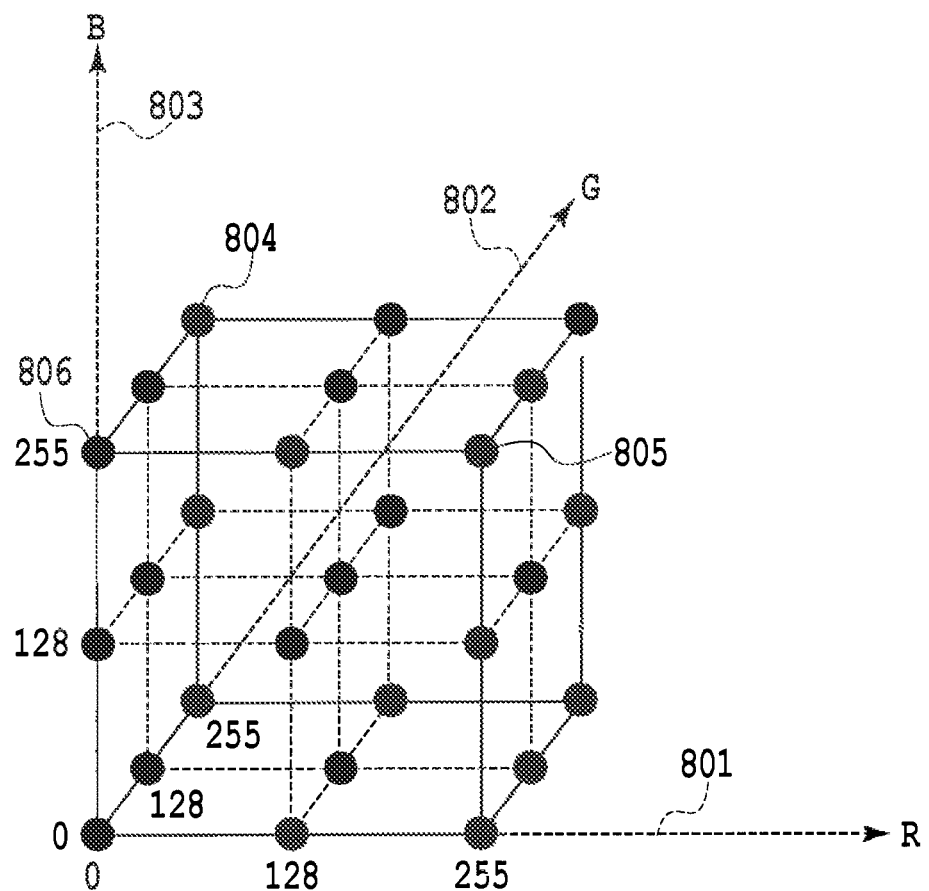
FIG. 8 is a diagram illustrating another example of processing to generate a table parameter of the MCS processing section.

Another example of processing S510 to generate table parameters for the MCS processing section can be as follows. First, a plurality of patches (images for measurement) in which values of device colors R, G, B are independently changed are printed by the print heads illustrated in FIG. 1. FIG. 8 illustrates distribution of colors of grid points in a device color space, in which each color has three gradations (0, 128, 255) and total 3×3×3=27 grid points are printed on the basis of combinations of the three gradations. FIG. 8 illustrates an RGB color space in which 801, 802 and 803 indicate red axis, green axis and blue axis, respectively. Grid points indicated by black circles represent colors for patch printing. Grid points indicated by 804 to 806 are the colors described as examples in the aforementioned embodiment; and 804, 805 and 806 indicate cyan, magenta and blue colors, respectively. A table structure indicated by these grid points in FIG. 8 is the same as that described with reference to FIGS. 5A and 5B, except for how to generate correction data other than the 27 grid points as follows.

First, a patch is printed on the basis of device color (Rn, Gn, Bn) for each of the 27 grid points, and each patch is subjected to colorimetry to obtain a measurement value (Rp, Gp, Bp) for each patch. Next, a patch is printed on the basis of device color (Ri, Gi, Bi) for each of points other than the 27 grid points, and this patch is measured to obtain measurement value (Rt, Gt, Bt). Next, the patch color (Rp, Gp, Bp) that is the most similar to the measurement value (Rt, Gt, Bt) is selected to obtain device color (Rn, Gn, Bn) corresponding to the selected patch color. How to select the most similar patch color is as follows:

$$\sqrt{(Rt-Rp)^2+(Gt-Gp)^2+(Bt-Bp)^2}$$

A patch to print (Rp, Gp, Bp) is selected such that the solution of the above expression is minimum. Then, for the device color (Ri, Gi, Bi), a correction table is generated on the basis of a correction table of the device color (Rn, Gn, Bn) and is used in the MCS processing section. Practically, accuracy of correction other than the 27 grid points can be improved by printing in more gradations than those illustrated in FIG. 8, or by using a known method, such as interpolating a plurality of patches during estimation. A known interpolation method includes tetrahedral interpolation and cubic interpolation. In the case of tetrahedral interpolation, calculation may be performed by interpolating from four surrounding grid points that form a tetrahedral containing a measurement value (Rt, Gt, Bt). In the case of cubic interpolation, calculation may be performed by interpolating from eight surrounding grid points that form a cube containing a measurement value (Rt, Gt, Bt).

An example of a patch color suitable for MCS processing will be described below. When each of RGB in FIG. 8 is evenly divided to N gradations and a patch is printed, N^3 patches are printed. For example, if N=9, 729 patches are printed, and if N=17, 4913 patches are printed. If a length of one patch is, for example, 5 mm, a print paper of about 3.5 m is required to print 729 patches and a print paper of about 25 m is required to print 4913 patches.

Figure 12:
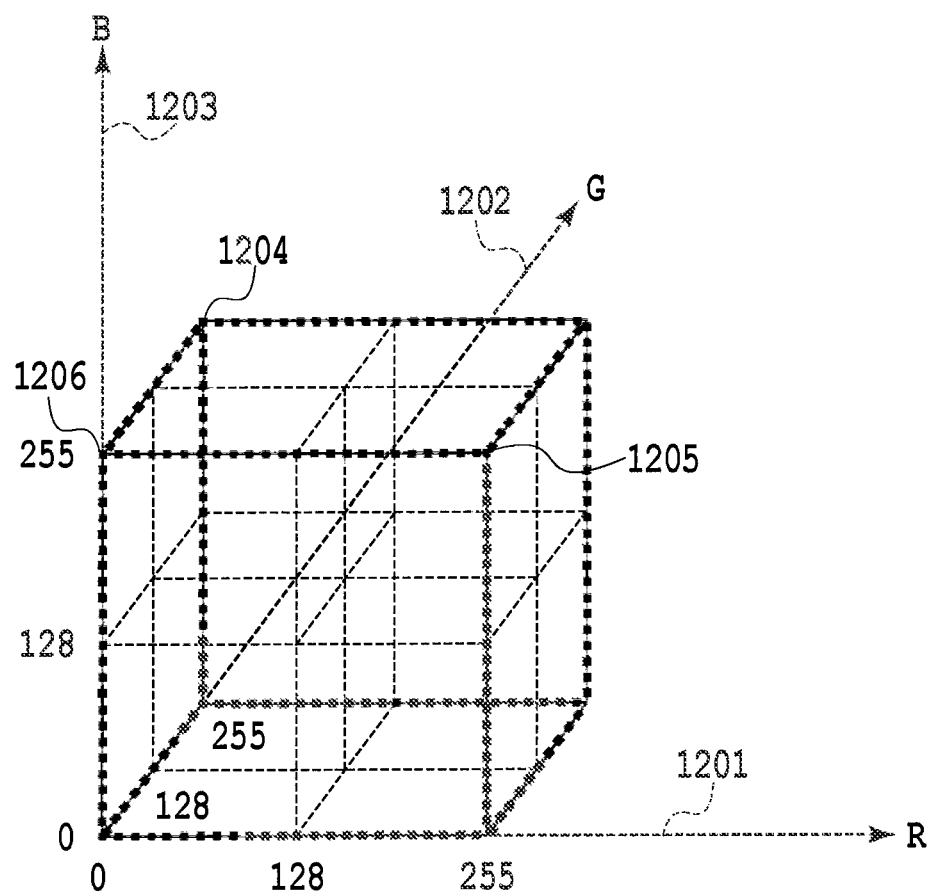
FIG. 12 is a diagram illustrating a patch color suitable for MCS processing.

FIG. 12 is a diagram illustrating a patch color suitable for MCS processing.

Since 1201 to 1206 in FIG. 12 correspond to 801 to 806 in FIG. 8, they will not be described.

A portion indicated by a thick dash line 1207 shows a patch color suitable for MCS processing.

The thick dash line 1207 is composed of the following 12 line segments:

TABLE 1

| | | | |
|---|---|---|---|
| Black | (R = 0, G = 0, B = 0) | to Red | (R = 255, G = 0, B = 0) |
| Black | (R = 0, G = 0, B = 0) | to Green | (R = 0, G = 255, B = 0) |
| Black | (R = 0, G = 0, B = 0) | to Blue | (R = 0, G = 0, B = 255) |
| Red | (R = 255, G = 0, B = 0) | to Magenta | (R = 255, G = 0, B = 255) |
| Red | (R = 255, G = 0, B = 0) | to Yellow | (R = 255, G = 255, B = 0) |
| Green | (R = 0, G = 255, B = 0) | to Cyan | (R = 0, G = 255, B = 255) |
| Green | (R = 0, G = 255, B = 0) | to Yellow | (R = 255, G = 255, B = 0) |
| Blue | (R = 0, G = 0, B = 255) | to Cyan | (R = 0, G = 255, B = 255) |
| Blue | (R = 0, G = 0, B = 255) | to Magenta | (R = 255, G = 0, B = 255) |
| Cyan | (R = 0, G = 255, B = 255) | to White | (R = 255, G = 255, B = 255) |
| Magenta | (R = 255, G = 0, B = 255) | to White | (R = 255, G = 255, B = 255) |
| Yellow | (R = 255, G = 255, B = 0) | to White | (R = 255, G = 255, B = 255) |

If the thick dash line 1207 in FIG. 12 is divided to N gradations and a patch is printed, (N−2)×12+8 patches are printed. For example, in the case of N=5, 44 patches are printed; in the case of N=9, 92 patches are printed; and in the case of N=17, 188 patches are printed, which is less than 216 patches in the case of N=6 in FIG. 8.

In the present embodiment, only patches on this thick dash line 1207, which are grid points of respective edges of a color cube, are printed and subjected to colorimetry, and from the result of the colorimetry, a color inside the thick dash line 1207 is estimated. This permits finely obtaining a colorimetry value at the outermost of a color region reproduced by a printer.

Figure 13:
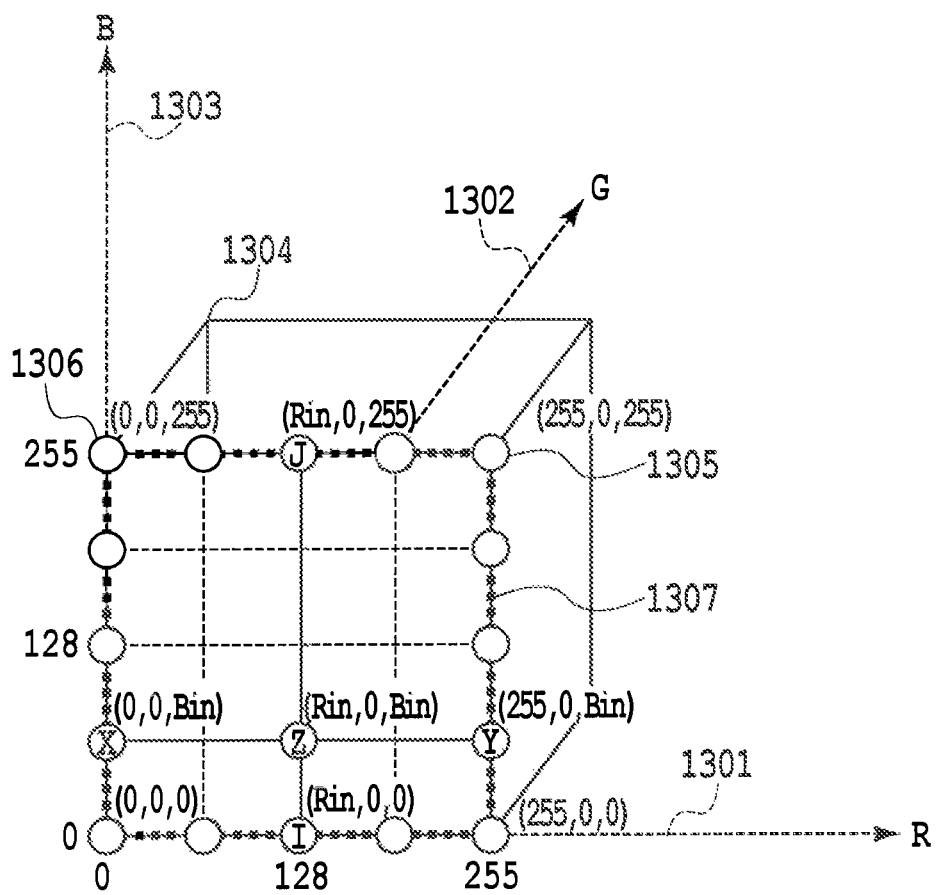
FIG. 13 is a diagram illustrating an example in which a color on the surface of a color cube is estimated.
Figure 14:
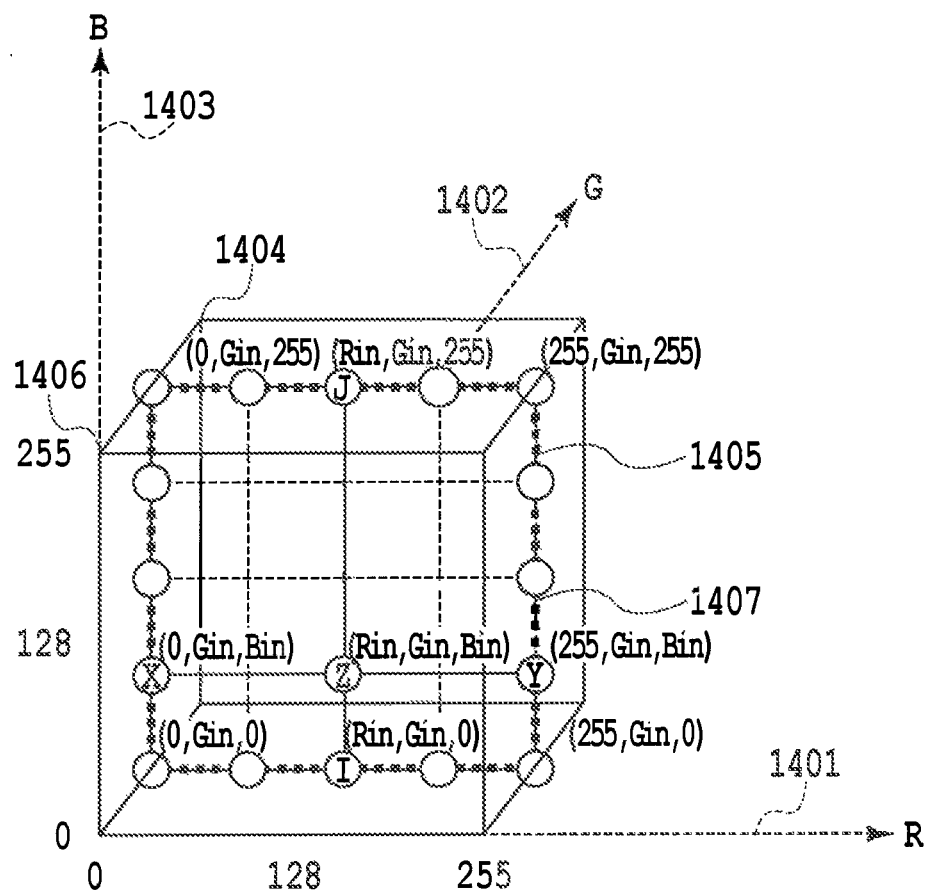
FIG. 14 is a diagram illustrating an example in which a color inside a color cube is estimated.

With reference to FIGS. 13 and 14, a method to estimate a color other than patches on the thick dash line 1207 of the color cube in FIG. 12 will be described. In the present embodiment, an example in the case of N=5 will be described to simplify the description.

First, colors of six surfaces in the color cube are estimated. Six surfaces are surfaces, each fulfilling a condition that RGB is R=0 (minimum value), R=255 (maximum value), G=0 (minimum value), G=255 (maximum value), B=0 (minimum value), or B=255 (maximum value).

FIG. 13 is a diagram illustrating an example in which a color Z of coordinates (Rin, 0, Bin) in the surface of G=0 is estimated. In FIG. 13, 1301 to 1306 correspond to 1201 to 1206 in FIG. 12 and therefore will not be described. In FIG. 13, white circle portions indicate print patches in the case of N=5, and colorimetry values already exist for these white circle portions.

A thick dash line 1307 indicates a portion surrounding the surface of G=0 of the printed patches. The surface of G=0 are surrounded by four edges: black (0, 0, 0) to blue (0, 0, 255), blue (0, 0, 255) to magenta (255, 0, 255), red (255, 0, 0) to magenta (255, 0, 255), and black (0, 0, 0) to red (255, 0, 0) edges. Here, an estimate value of a color Z for an input value of the color (Rin, 0, Bin) in the surface of G=0 can be calculated in two calculation methods. In a first calculation method, the estimate value of color Z is calculated from a color X corresponding to (0, 0, Bin) of black to blue colorimetry values and a color Y corresponding to (255, 0, Bin) of red to magenta colorimetry values according to the following expression:

$$Z \text{ estimate value } 1 = (Y*Rin) + (X*(255-Rin))/255$$

In a second calculation method, the estimate value of color Z is calculated from a color I corresponding to (Rin, 0, 0) of black to red colorimetry values and a color J corresponding to (Rin, 0, 255) of blue to magenta colorimetry values according to the following expression:

$$Z \text{ estimate value } 2 = (J*Bin) + (I*(255-Bin))/255$$

In the present embodiment, a final Z estimate value is an average value of the aforementioned Z estimate value 1 and Z estimate value 2.

This method is termination of estimating a color (Rin, 0, Bin) in the surface of G=0. Similarly, the remaining colors in the surface of G=0 are estimated. In the case of N=5, colors of total (N−2)^2=9 points are estimated.

Similarly, colors in the remaining five surfaces are estimated. In this way, in the case of N=5, colors of total (N−2)^2*6=54 points in the total six surfaces are estimated.

Next, a color inside the color cube is estimated (interpolated).

FIG. 14 is a diagram illustrating an example in which a color of coordinates (Rin, Gin, Bin) inside the color cube. 1401 to 1406 in FIG. 14 correspond to 1301 to 1306 in FIG. 13 and therefore will not be described.

White circle portions in FIG. 14 indicate colors that are printed patches and have been estimated in the case of N=5, and therefore colorimetry values or estimate values already exist for these white circle portions. That is, they include a grid point whose three elements are equal and a grid point whose two of three elements are equal and the remaining one element is a minimum or maximum value.

A thick dash line 1407 surrounds a portion of the surface of G=Gin of the printed patches and estimate values. The surface of G=Gin is surrounded by four edges: (0, Gin, 0) to (0, Gin, 255), (0, Gin, 255) to (255, Gin, 255), (255, Gin, 0) to (255, Gin, 255), and (0, Gin, 0) to (255, Gin, 9) edges.

Here, an estimate value of a color Z for an input value of a color (Rin, Gin, Bin) in the surface of G=Gin can be calculated in two methods. In a first method, an estimate value of color Z is calculated from a color X corresponding to (0, Gin, Bin) and a color Y corresponding to (255, Gin, Bin) according to the following expression:

$$Z \text{ estimate value } 1 = (Y*Rin) + (X*(255-Rin))/255$$

In a second method, an estimate value of color Z is calculated from a color I corresponding to (Rin, Gin, 0) and a color J corresponding to (Rin, Gin, 255) according to the following expression:

$$Z \text{ estimate value } 2 = (J*Bin) + (I*(255-Bin))/255$$

In a method to estimate a color of coordinates (Rin, Gin, Bin) inside a color cube, two estimate values can be similarly calculated from each of a surface of R=Rin and a surface of B=Bin, in addition to the aforementioned method to estimate from the surface of G=Gin.

Therefore, in the present embodiment, a final Z estimate value is an average value of six estimate values that are the Z estimate value 1 and Z estimate value 2 calculated from the three surfaces of R=Rin, G=Gin, and B=Bin, respectively.

This method is termination of estimating a color of coordinates (Rin, Gin, Bin) inside the color cube. Similarly, the remaining colors of coordinates inside the color cube are estimated. In the case of N=5, colors of total $(N-2)^3=27$ points are estimated in the whole of inside of the color cube.

By estimating described above, 81 estimate values are calculated from the colorimetry values of 44 print patches in the case of N=5, thereby obtaining color information of total $5^3=125$ points.

Next, in the MCS processing parameter generation process 510, by using this color information, patch colors (+estimate colors) Rp, Gp, Bp, which are the most similar to target colors RT, GT, BT of the device colors Ri, Gi, Bi, are estimated. Next, device colors Rn, Gn, Bn corresponding to the patch colors (+estimate colors) are estimated.

Then, a correction table to convert the device colors (Ri, Gi, Bi) to the device colors (Rn, Gn, Bn) is generated.

This permits accurately generating a correction table with a small number of patches.

The MCS processing section 404 must have a configuration to change a correction content depending on each print region as a color shift amount correction method depending on a combination of respective ink color ejection volumes.

That is, for example, the MCS processing section may have a three-dimensional lookup table for each print region and may change the three-dimensional lookup table depending on the print region.

As described above, the present invention performs MCS processing for converting image data for an image to be printed on the print area by using the conversion table to reduce the color difference of composite color printed between the print areas, when the respective print area is printed by using inks of two or more colors. The print area is one of a plurality of unit areas into which the printable area is divided with respect to the nozzle arrangement direction. The MCS processing that is performed by using the conversion table for every print area can reduce the color difference of the composite color, that the conventional head shading processing that is performed by using one dimensional LUT can not reduce.

Further, MCS processing of the present embodiment is performed by using the conversion table that can simultaneously perform the ink conversion process at the ink conversion process unit 404 and the MCS processing. The conversion table is the conversion table that converts the image data corresponding to R, G, B into the image data corresponding to C, M, Y, K.

Further, in the present embodiment, it is explained that the print head is provided for every ink color. However, the present invention may adopt a manner that one print head has nozzle arrays corresponding to a plurality of colors. In the case where the print head is provided for every ink color as in the present embodiment, it is possible to reduce the color difference which occurs due to the effect of the arrangement error of the ejection substrate. In the case where a position of the nozzles is shifted due to the arrangement error of the ejection substrate, a color printed by using inks of two or more colors is different from a target color. The present invention can reduce the color difference which occurs in the above case because the present invention performs the above MCS processing after setting the correspondence relationship between the unit area and the nozzles used for printing the print area (the unit area). As mentioned above, it is possible to correct the composite color so as to match the characteristics of the nozzles of the print area (the unit area) by setting the correspondence relationship between the unit area and the nozzles before performing the MCS processing. That is, even if the nozzles for the respective ink colors, which are used for a print of a certain printing area, are formed on the different substrates, respectively, there is a conversion table generated with respect to the nozzles used for the respective ink colors used for the print of the print area. Accordingly, image data to be printed with nozzles corresponding to the print area can be corrected and a color difference due to a position error also can be reduced regardless of an existence of positional error of the nozzles.

Figure 15:
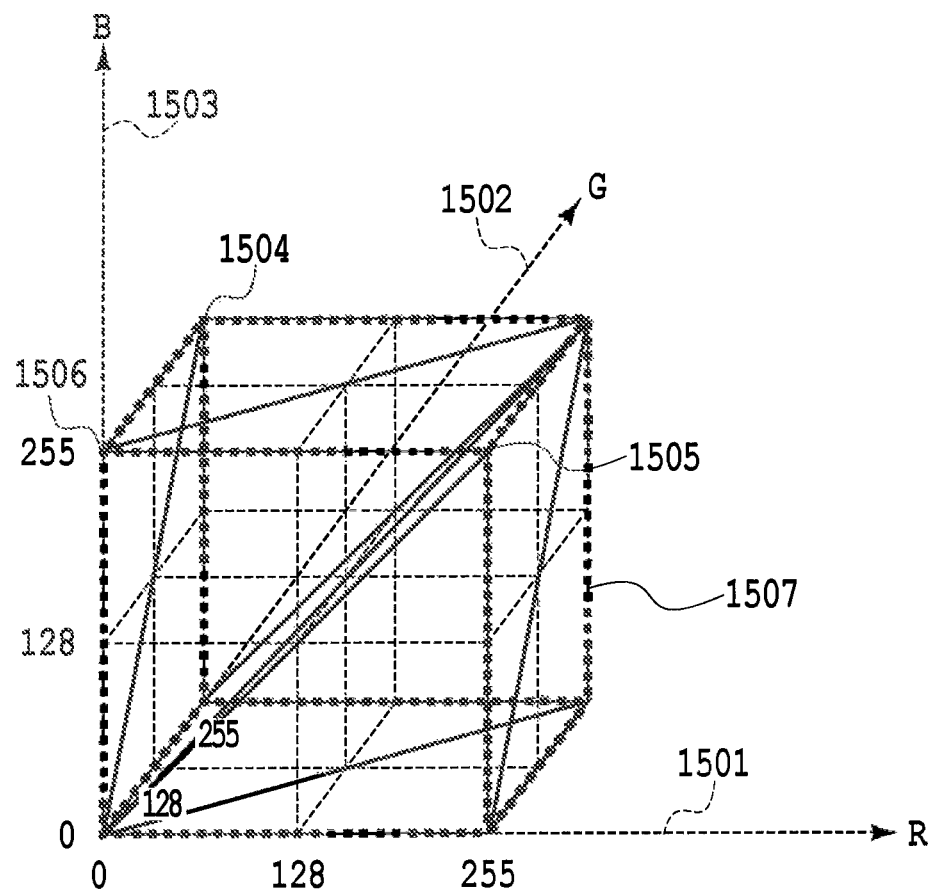
FIG. 15 is a diagram illustrating an example of a patch color that enables color information to be more accurately and efficiently obtained.

In the present embodiment, print patches are set on 12 line segments as illustrated in FIG. 12, but it is preferable to print patches on the 12 line segments plus another seven line segments as illustrated in FIG. 15 in order to obtain color information more accurately and more efficiently.

FIG. 15 is an example of a patch color by which color information can be obtained more accurately and more efficiently. 1501 to 1507 in FIG. 15 correspond to 1201 to 1207 in FIG. 12 and therefore will not be described. 1508 are additional seven line segments and each of them is as follows:

TABLE 2

| Black | (R = 0, G = 0, B = 0) | to Cyan | (R = 0, G = 255, B = 255) |
| Black | (R = 0, G = 0, B = 0) | to Magenta | (R = 255, G = 0, B = 255) |
| Black | (R = 0, G = 0, B = 0) | to Yellow | (R = 255, G = 255, B = 0) |
| Red | (R = 255, G = 0, B = 0) | to White | (R = 255, G = 255, B = 255) |
| Green | (R = 0, G = 255, B = 0) | to White | (R = 255, G = 255, B = 255) |
| Blue | (R = 0, G = 0, B = 255) | to White | (R = 255, G = 255, B = 255) |
| Black | (R = 0, G = 0, B = 0) | to White | (R = 255, G = 255, B = 255) |

If total 19 line segments in FIG. 15 are divided to N gradations and patches are printed, $(N-2) \times 19 + 8$ patches are printed. For example, in the case of N=5, 65 patches are printed; in the case of N=9, 141 patches are printed; and in the case of N=17, 293 patches are printed, which is less than 343 patches in the case of N=7 in FIG. 8.

A method for estimating a color inside a color cube in FIG. 15 is performed as with FIGS. 13 and 14, and colorimetry values of seven line segments added in FIG. 15 are not subjected to estimation but are used as they are.

This enables color information such as blue to white to be finely obtained, and correction tables can be accurately generated using a small number of patches.

As long as advantageous effects of the present invention can be obtained, a color estimation method is not limited to the interpolation method used in description on FIGS. 13 to 15, but another known method can be used.

Similarly, FIG. 12 has been described using an example of 12 line segments, and FIG. 15 has been described using an example of 19 line segments, but the number of line segments are not limited to 12 and 19. The number of line segments may be 13 to 18 by using some of the additional seven line segments illustrated in FIG. 15, not all of them.

Figure 16:
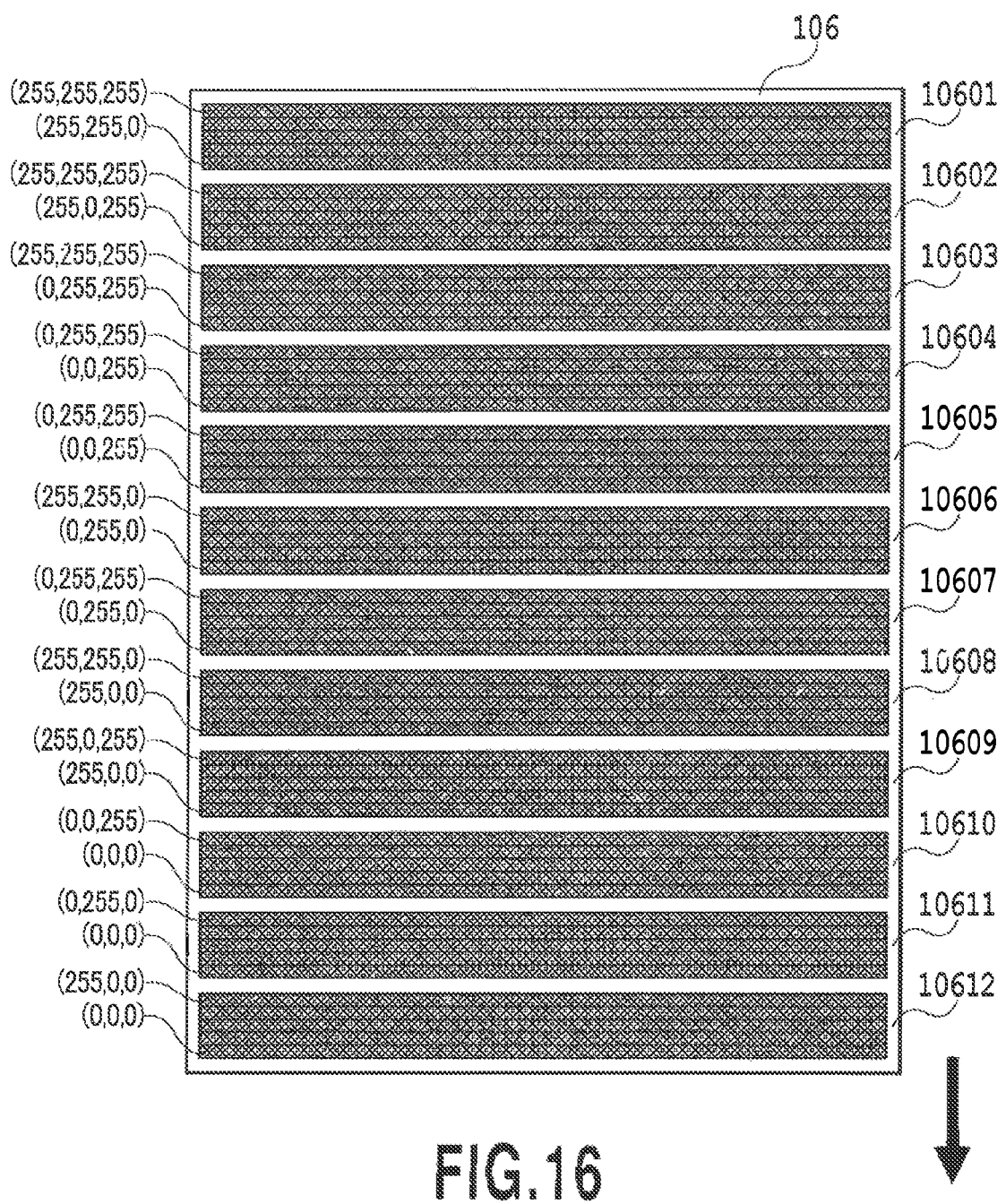
FIG. 16 is a diagram illustrating an example in which a patch color suitable for MCS processing is printed on a print medium.

FIG. 16 illustrates a pattern example obtained by printing print patches of 12 line segments in FIG. 12 by N=5. In FIG.

16, 106 indicates a print paper, and 10601 to 10612 each indicates a print patch of each of the line segments. An input RGB value is indicated on the upper edge and lower edge of the each print patch.

Figure 17:
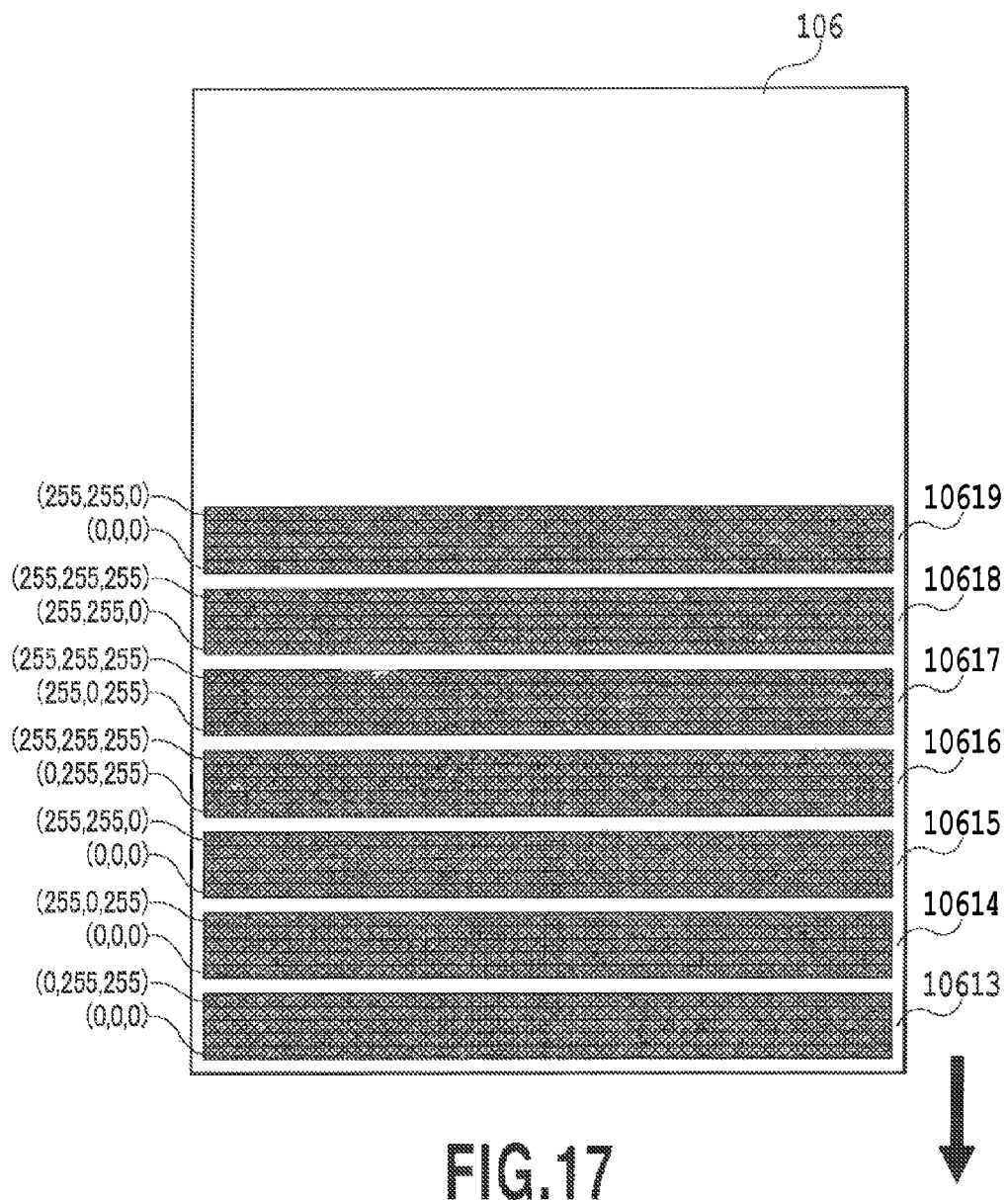
FIG. 17 is a diagram illustrating an example in which a patch color that enables color information to be more accurately and efficiently obtained is printed on a print medium.

FIG. 17 illustrates a pattern example obtained by printing print patches of seven additional line segments in FIG. 15 by N=5. In FIG. 17, 106 indicates a print paper, and 10613 to 10619 each indicates a print patch of each of the additional line segments. An input RGB value is indicated on the upper edge and lower edge of the each print patch.

In FIGS. 16 and 17, since a thick arrow indicates a carrying direction of a print paper, printing is performed from the lower side toward the upper side of the print paper. Therefore, an RGB value at the lower edge of each of the print patches is first printed.

Each of the print patches is disposed in the order of an RGV value from small to large because printing is performed from a patch whose ink volume for printing is larger to a patch whose ink volume for printing is smaller.

The present inventor and others have studied and found out that when printing is performed using "a long head" as illustrated in FIG. 1, on top of an uneven color caused by manufacturing variations, an uneven ink density tends to occur in which a density varies at a start position of printing of an image to a main scanning direction. Specifically, when printing attempts to be started after an array of ejection ports has not ejected ink due to a blank space of an image and so on for a predetermined time period during printing, an ink density adjacent to the ejection ports increases due to evaporation of ink from a surface of the ejection ports. This may cause an uneven ink density that makes the start position of printing of an image dense.

Figure 18:
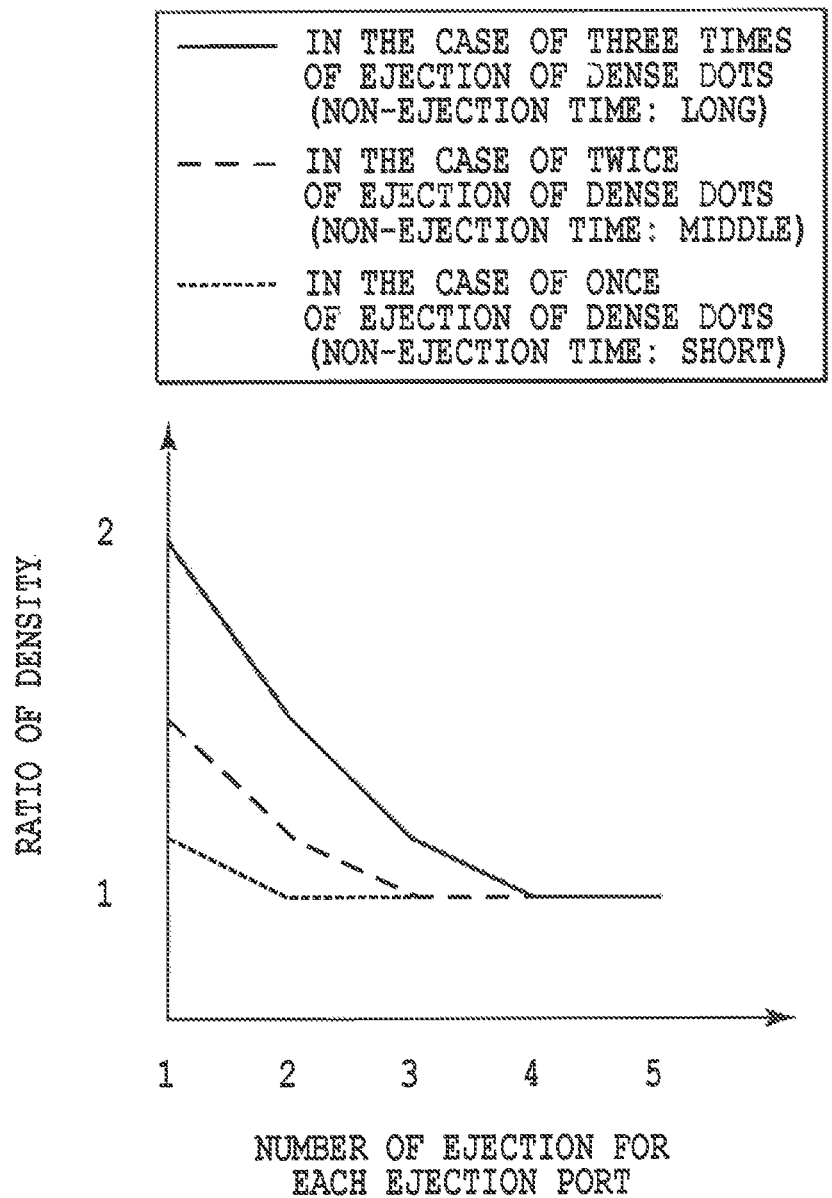
FIG. 18 is a diagram illustrating a relationship between the number of ejection for each ejection port and a density of ink.

FIG. 18 is a diagram illustrating a relationship between the number of ejection for each ejection port and an ink density ratio. The ink density ratio is defined by an ink density increased from a normal ink density due to evaporation. Since ink evaporates from a surface of an ejection port, how many ejected ink droplets from the first ink droplet have an increased density varies depending on the degree of evaporation. Three polygonal lines indicate a case in which the first ejected ink droplet has an increased density, a case in which the first and second ink droplets have an increased density, and a case in which the first, second and third ink droplets have an increased density, respectively. If dots with an increased ink density are concentrated in a start position of printing of an image in this way, an uneven ink density can visually be recognized.

As the number of print patches increases, the possibility of occurrence of the aforementioned uneven ink density increases while the patches are being printed. This possibility can be reduced by printing a patch in the order of an ink volume for printing from large to small due to the following reasons.

Since, in a patch with a larger ink volume for printing, ink is ejected from each ejection port twice or three times with the smaller number of pixels, an effect of an uneven ink density is limited to a narrow space. As the result, an uneven ink density of this has a smaller effect than a patch with a smaller ink for printing.

While a patch with a larger ink volume for printing is being printed, a frequency of ejection is high and therefore an uneven ink density is unlikely to occur when the next patch in printed.

In FIGS. 16 and 17, patches are arranged in the order of an RGB value from small to large because in this arrangement patches are arranged in the order of an ink volume to be used from large to small. A suitable arrangement may vary depending on a type of ink to be used and how to use the ink. In the following case, an ink volume to be used for a cyan patch may be larger than an ink volume to be used for a blue patch depending on how to use a light cyan. For example, it applies to the case where a light cyan ink as well as CMYK four colors are used to perform printing and the case where patches of cyan (0, 255, 255) to blue (0, 0, 255) colors are arranged.

In such a case, in the order of an RGB value from large to small, printing a cyan patch first reduces the possibility of occurrence of an uneven ink density.

Alternatively, an arrangement of patches may be decided depending on an ink volume for printing that is more affected by the uneven ink density, instead of an ink volume for printing of all inks of the patches.

In the case where the number of ink colors for printing the patches is more or equal to three, patches that need the more number of ink colors with a larger ink volume may be first printed.

First Variation of First Embodiment

FIG. 4B is a block diagram illustrating a configuration of an image processing unit of an inkjet printer according to a first variation. In FIG. 4B, sections indicated by reference characters 401 and 405 to 409 are identical to sections indicated by the same reference characters in FIG. 4A, and therefore will not be described. This variation is different from the configuration illustrated in FIG. 4A in that an input color conversion processing section and an MCS processing section are integrated as one processing section.

Specifically, an input color conversion processing & MCS processing section 411 uses one table generated by combining a table of the input color conversion processing section and a table of the MCS processing section. This allows for color shift correction processing directly on image data inputted from the input unit 401, thereby outputting device color image data whose color shift has been reduced.

Figure 20A:
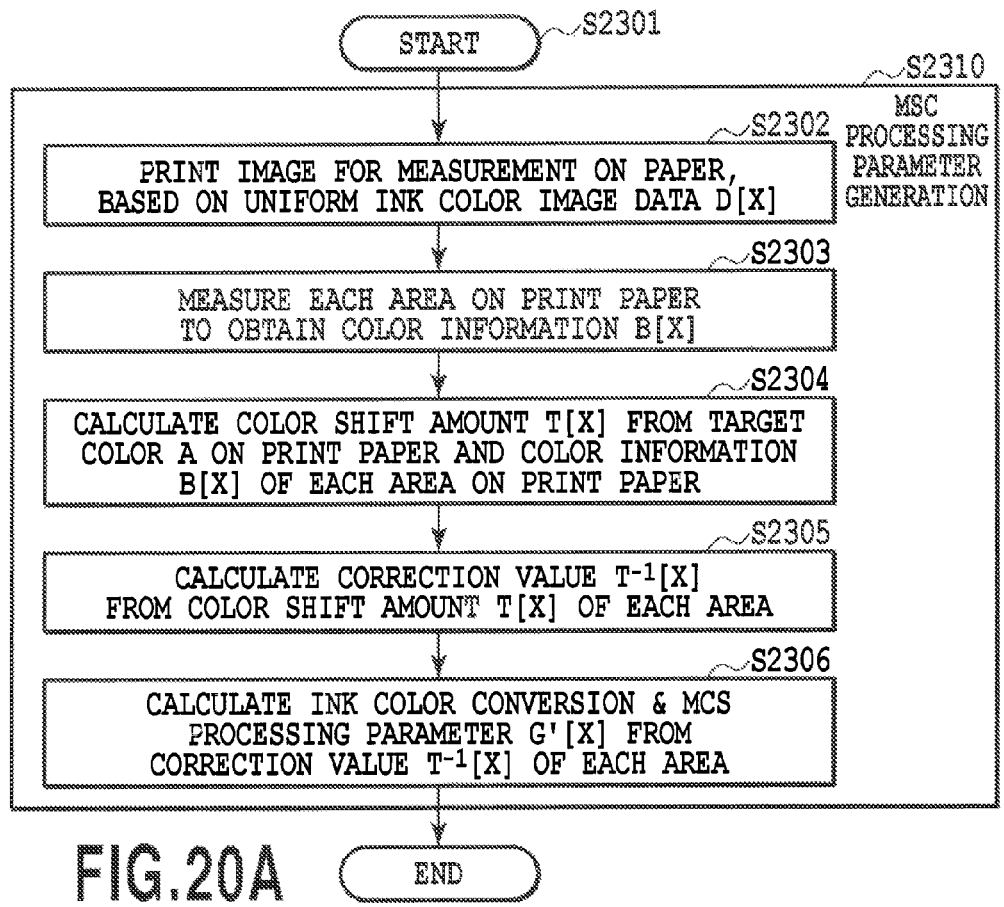
FIGS. 20A and 20B are flow charts, illustrating processing to generate parameters for a table used in an ink color conversion processing & MCS processing section 2104 in FIG. 19A and processing by the ink color conversion processing & MCS processing section 2104 using this table.
Figure 20B:
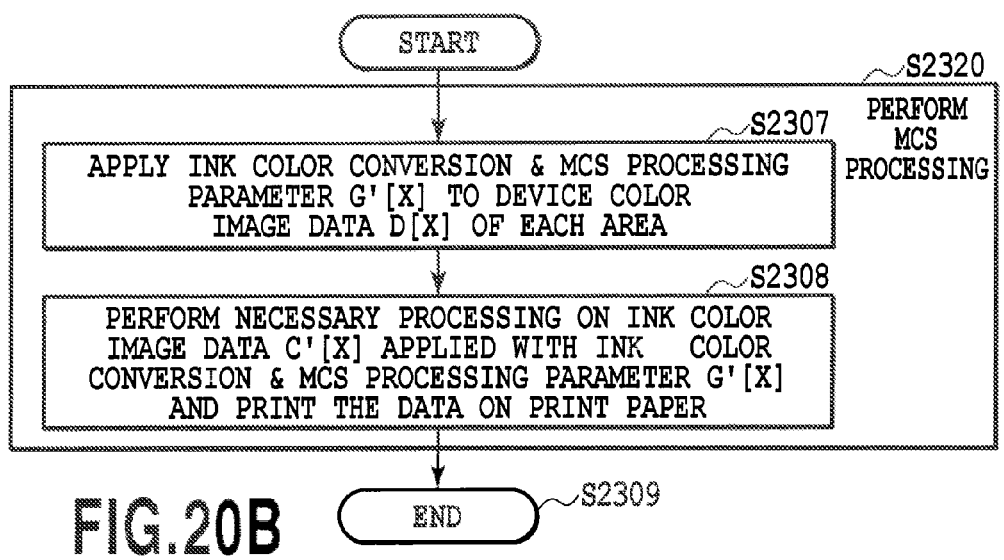

FIGS. 20A and 20B are flow charts, illustrating processing to generate table parameters for the MCS processing section and processing by the MCS processing section, respectively, according to the first variation, which are similar to those in FIGS. 5A and 5B. Processing S910 to generate table parameters for the MCS processing section in FIG. 20A is different from the processing S510 in FIG. 5A with respect to processing of Step S902 and Step S906. The processing in Step S902 and S906 will be described below.

In Step S902, an image for measurement is printed on a print paper for color shift correction, on the basis of color image data I[X] inputted from the input unit 401. In doing so, of the input color conversion processing & MCS processing section 411, only a portion corresponding to the input color conversion processing section is made to function, and the MCS processing is skipped through a bypass processing path indicated by the dash line 410. Specifically, the input color conversion processing & MCS processing section 411 is configured to be able to use two tables by switching. That is, for input image data I[X], a table having color conversion W' that is combination of the input color conversion processing and the processing of the MCS processing section, which will be described below, as table parameters and a table having table parameters of only the input color conversion processing are switched to be used. In printing an image for measurement, the table of only the input color conversion processing is used by switching.

A color conversion coefficient of input color conversion processing with this table used for printing an image for measurement is set to be a input color conversion W, then, the following expression is established: device color data D[X] =input color conversion W (input image data I[X]). Uniform device color image data D[X] obtained in this way, as with the first embodiment, proceeds through the ink color conversion processing section 405, HS processing section 406, TRC processing section 407 and quantization processing section 408 to the output unit 409, where the data is printed on the print paper 106 as an image for measurement.

In Step S906, an equivalent color conversion W'[X] as a table parameter is calculated from a correction value $T^{-1}[X]$ for each area. This W[X] is color conversion that combines the input color conversion W and equivalent color correction $Z^{-1}[X]$. Calculation processing of the equivalent color correction $Z^{-1}[X]$ is the same as that of the first embodiment and therefore will not be described.

Figure 10A:
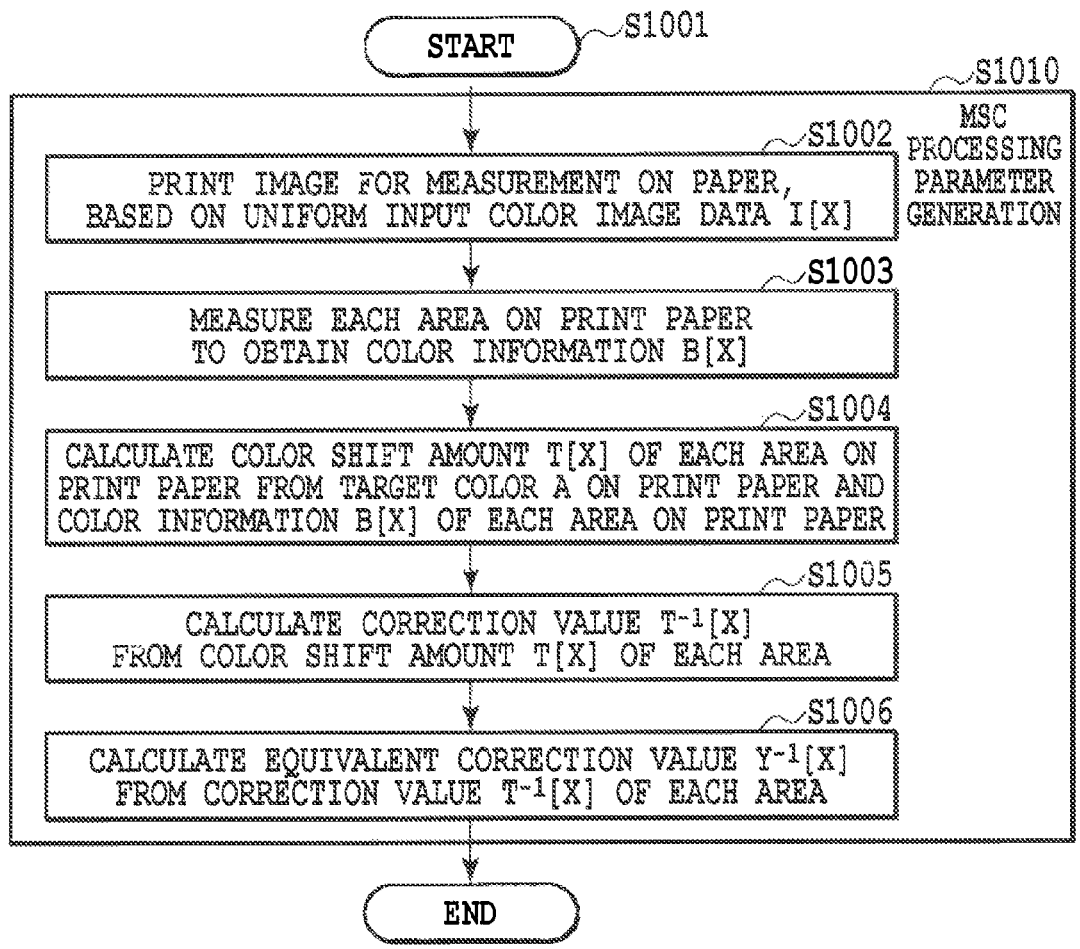
FIGS. 10A and 10B are diagrams illustrating an MCS processing flow according to a second variation.
Figure 10B:
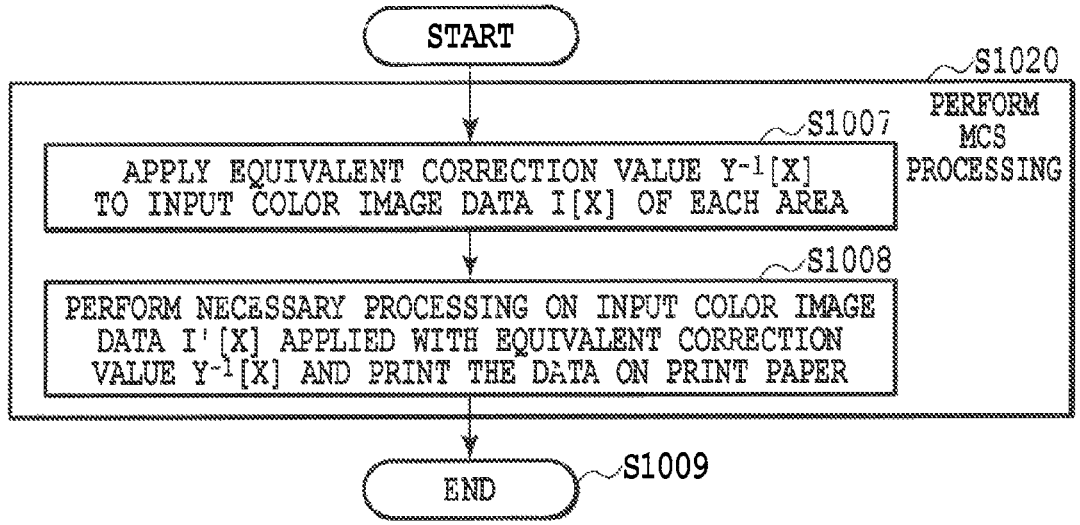

In processing S920 in FIG. 10B, which is processing by the input color conversion processing & MCS processing section 411 in generating print data, the equivalent color conversion W'[X] generated as above as a table parameter is used to correct a color shift. That is, color shift correction is performed on input color image data I[X] corresponding to each area, and device color image data D'[X] that has been subjected to color shift correction is outputted. Then, the device color image data D'[X] is subjected to processing in the ink color conversion processing section 405 and the subsequent sections, and printed on the print paper is the output unit 409.

According to the aforementioned variation, since equivalent color conversion W[X] is set in Step S906 so that device color image data D'[X] has the same value as that of the first embodiment, a color shift can be reduced, as with the first embodiment. Since combined color conversion $W^{-1}[X]$ of equivalent color correction $Z^{-1}[X]$ and input color conversion W is stored as one three-dimensional lookup table, the number of times to refer to the lookup table can be reduced from twice to once in generating print data in comparison with the first embodiment, thereby improving a processing speed. Meanwhile, the first embodiment has an advantage over the first variation in the following point. That is, in the first variation, three-dimensional lookup tables corresponding to "the number of print regions" and "types of input colors" must be stored, and therefore the number of three-dimensional lookup tables to be stored increases in proportion to increase of types of input colors (for example, sRGB, YCC, L*a*b*). In the first embodiment, the number of three-dimensional lookup tables to be stored does not increase even if types of ink colors increase. It can be said that in the first variation a correction accuracy is reduced due to combining lookup tables.

Second Variation of First Embodiment

FIG. 4C is a block diagram illustrating a configuration of an image processing unit according to a second variation of the first embodiment. As illustrated in FIG. 4C, in the present variation, processing by the MCS processing section 404 is performed before processing by the input color conversion processing section 403.

FIGS. 13A and 13B are flow charts, illustrating processing to generate table parameters for the MCS processing section and processing by the MCS processing section, according to the second variation, respectively, which illustrate the similar processing illustrated in FIGS. 5A and 5B. In processing S1010 in FIG. 13A, processing in Steps S1002 and S1006 is different from processing in FIG. 5A, which will be described below.

In Step S1002, input color image data I[X] from the input unit 401 bypasses the MCS processing section 404 to the input color conversion processing section 403, where the input color image data I[X] is converted to device color D[X]. After that, as with FIG. 5A according to the first embodiment, the device color D[X] proceeds through the ink color conversion processing section 405, HS processing section 406, TRC processing section 407 and quantization processing section 408 to the output unit 409, where an image for measurement is printed on the print paper 106. Then, in Step S1006, an equivalent correction value $Y^{-1}[X]$ to correct a color of an input color space is calculated.

The equivalent correction value $Y^{-1}[X]$ is a correction value to correct an input color equivalent to an equivalent correction value $Z^{-1}[X]$ that corrects a color of a device color space that is calculated in Step S506 of FIG. 5A. The calculation processing of the equivalent correction value $Y^{-1}[X]$ is the same as that of the first embodiment and therefore will not be described here.

Next, the procedure of processing S1020 in FIG. 13B are as follows. In FIG. 13B, in Step S1007, the MCS processing section 404 corrects input color image data I[X] for each area in such a way that an equivalent correction value $Y^{-1}[X]$ is applied to the input color image data I[X] for each area, using the table generated in the processing S1010. Then in Step S1008, input color image data I'[X] corrected by the equivalent correction value $Y^{-1}[X]$ is converted to device color image data D'[X] in the input color conversion processing section 405. Processing subsequent to this processing is the same as that of the first embodiment and therefore will not be described here.

According to the present variation, processing by the MCS processing section 404 is performed before processing by the input color conversion processing section 403, thereby improving independence of modules. For example, the present variation can be applied, as an expanded function, to an image processing unit without an MCS processing section. Or, the processing can be performed in the host PC.

Third Variation of First Embodiment

FIG. 4D is a block diagram illustrating a configuration of an image processing unit according to a third variation of the first embodiment. As illustrated in FIG. 4D, the present variation relates to a configuration without the HS processing section 406 illustrated in FIG. 4A.

Processing to generate table parameters for the MCS processing section and processing by the MCS processing section in the present variation are the same as processing illustrated in FIGS. 5A and 5B according to the first embodiment except that head shading is not performed in the HS processing section in the present variation. That is, HS processing is not performed before Step S502 illustrated in FIG. 5A.

Figure 11A:
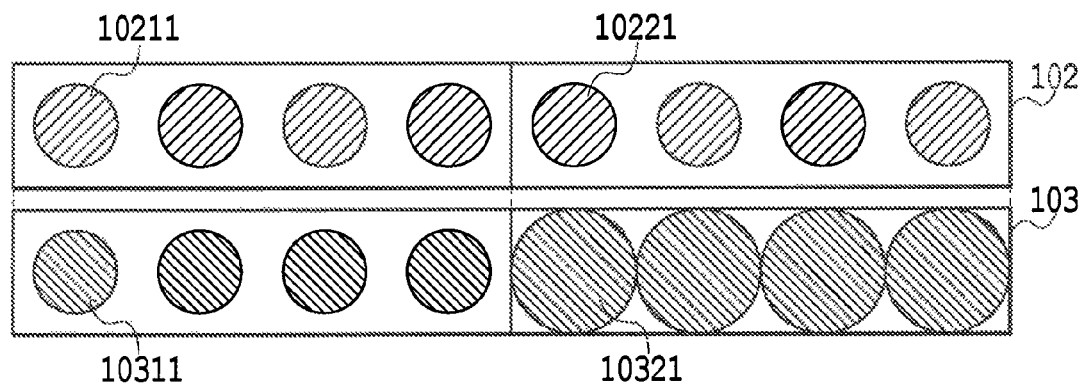
FIGS. 11A and 11B are diagrams illustrating an example of a print image during an MCS processing parameter generation process according to a third variation.
Figure 11B:
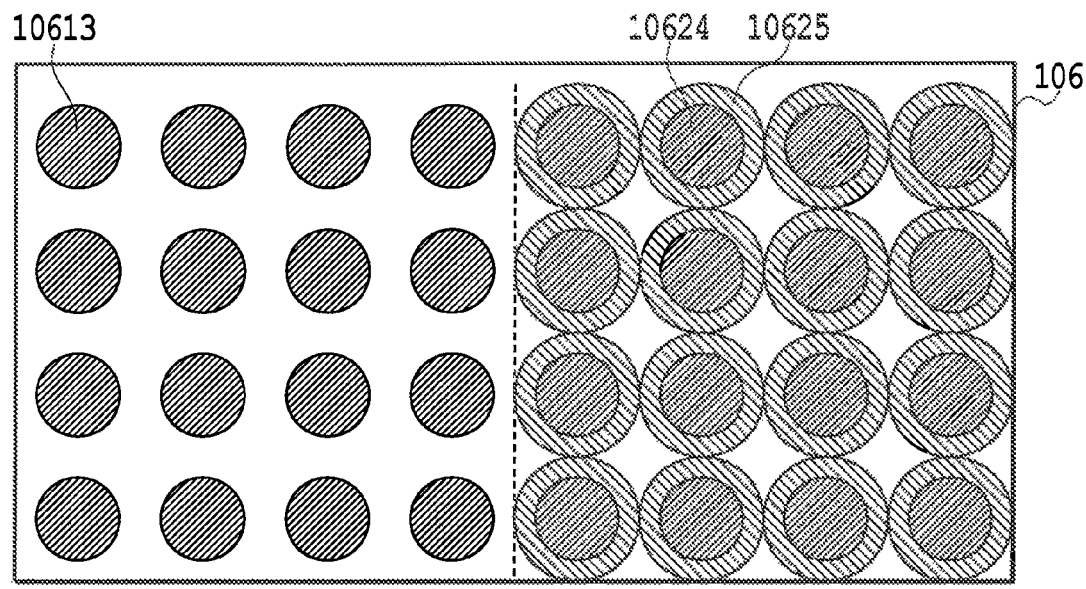

FIGS. 11A and 11B are diagrams illustrating printing examples of an image for measurement in Step S502 of FIG. 5A according to the present variation, which are similar to the diagrams illustrated in FIGS. 6A and 6B. As illustrated in FIG. 11B, since HS processing is not performed in printing of an image for measurement, the number of printed dots is the same between a region corresponding to four nozzles on the left in the FIG. 11B and a region corresponding to four nozzles on the right in the FIG. 11B. As a result, the color of the region on the right has a stronger magenta cast in comparison with the example illustrated in FIG. 6B according to the first embodiment. As a result, in generating table parameters in processing S510 illustrated FIG. 5A, a correction value to reduce magenta color is generated. This enables a correction value for obtaining an printing result illustrated in FIG. 7B to be a table parameter for the MCS processing, thereby reducing a color shift without performing HS processing.

In addition, direct advantageous effects of not performing HS processing include: the increase of a processing speed, the reduction of resources such as a table for HS processing, the reduction of processing processes by not performing "printing", "measurement" or "correction parameter generation" for HS processing. Meanwhile, the first embodiment has an advantage over the third variation in the following point. That is, in the third variation, since MCS processing corrects both a single ink color gradation and an uneven color due to variations of an ejection volume, if a three-dimensional lookup table having the same size as that of the first embodiment is used, a correction accuracy is reduced. In order to realize the same correction accuracy as that of the first embodiment, a measure such as the increase of a size of the lookup table needs to be taken. It can be said that in the first embodiment since an single ink color gradation is to be corrected by HS processing and an uneven color is corrected by MCS processing, a correction accuracy is high.

The first embodiment and the first to third variations thereof have been described. The content of processing is only an example, but any means can be used as long as the means can realize the reduction of an uneven color that is an effect of the present invention.

Figure 9A:
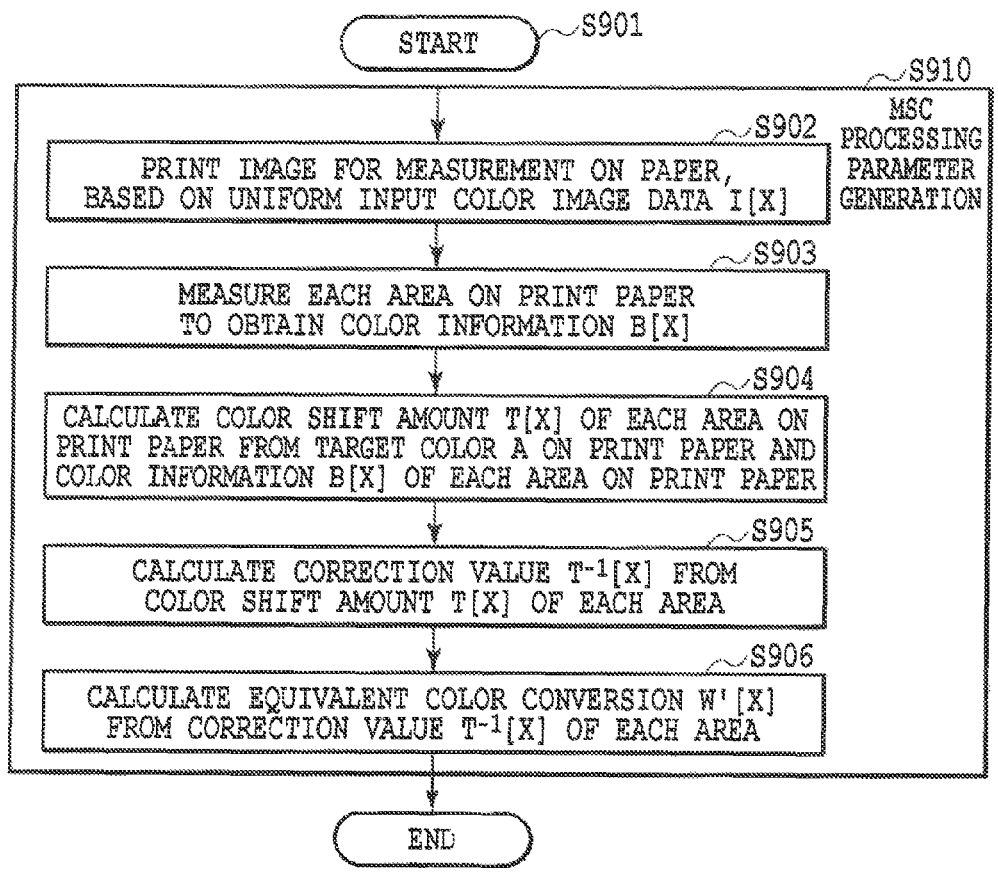
FIGS. 9A and 9B are flow charts, illustrating processing of a table parameter of an MCS processing section and processing by the MCS processing section, respectively, according to a first variation of the first embodiment.
Figure 9B:
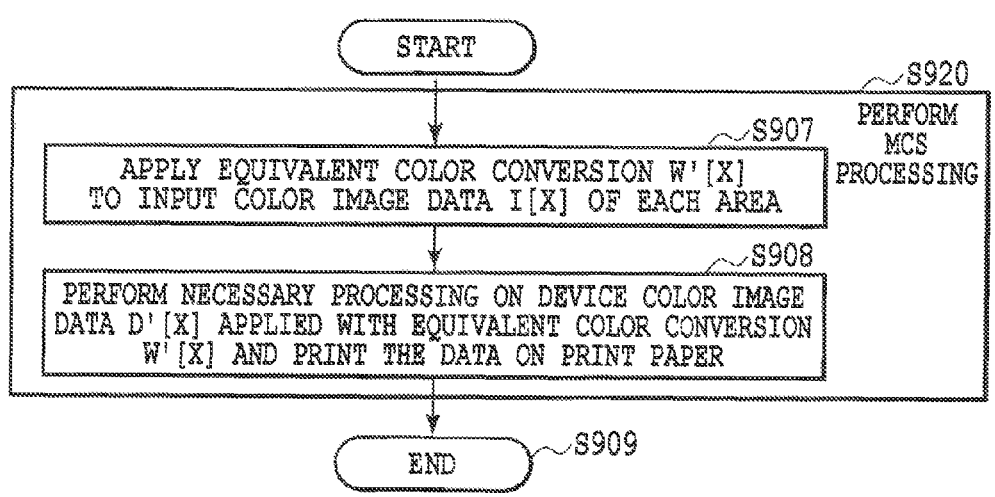

For example, in the processing to generate parameters for MCS processing in FIGS. 5A, 9A and 10A, a method in which a color shift amount is first measured and then a correction value is calculated is used. However, other methods can be used.

Since an objective of the present invention is to reduce an uneven color, setting a target color A is not essential. That is, a correction value for each print region may be set on the basis of a color shift between the print regions.

In FIG. 2, a region corresponding to four nozzles is set to one print region, but the present embodiment is not limited to this. A region corresponding to more than four nozzles may be set to one print region or a region corresponding to less than four nozzles, such as one nozzle, may be set to one print region. The number of nozzles belonging to each print region is not necessarily the same, but can be properly set depending on a property of a device.

Second Embodiment

FIG. 19A is a block diagram illustrating a configuration of an image processing unit to generate print data according to a second embodiment of the present invention. The configuration illustrated in FIG. 19A is different from the configuration according to the first embodiment illustrated in FIG. 4A with respect to processing by an ink color conversion processing & MCS processing section 2104. The processing by this ink color conversion processing & MCS processing section 2104 will be described below.

The ink color conversion processing & MCS processing section 2104 performs ink color data conversion processing as well as color correction processing on device color image data obtained by input color conversion processing thereby to output ink color data whose color shift has been reduced.

FIGS. 20A and 20B are flow charts illustrating processing to generate parameters of a table to be used by the ink color conversion processing & MCS processing section 2104 illustrated in FIG. 19A and processing by the ink color conversion processing & MCS processing section 2104 using the table, respectively.

In FIGS. 20A and 20B, processing in Steps S2306, S2307 and S2308 is essentially different from the processing according to the first embodiment illustrated in FIGS. 5A and 5B, and which will be described below.

In Step S2306 of FIG. 20A, an ink color conversion & MCS processing parameter G'[X] is calculated from a correction value $T^{-1}[X]$ for each area. This calculation processing are roughly divided to two processing: processing to calculate an equivalent correction value $Z^{-1}[X]$ from a correction value $T^{-1}[X]$ and processing to calculate an ink color conversion & MCS processing parameter G'[X] from the equivalent correction value $Z^{-1}[X]$.

First, an equivalent correction value $Z^{-1}[X]$ is calculated from a correction value $T^{-1}[X]$. If the correction value $T^{-1}[X]$ is a correction value of a blue color in a measurement color space, an equivalent correction value $Z^{-1}[X]$ to correct a blue color of a device color space by the same amount of this correction value $T^{-1}[X]$ in a device color space is calculated on the basis of this correction value.

Here, an equivalent correction value $Z^{-1}[1]$ is an equivalent correction value in a region corresponding to four nozzles in FIG. 6B and is ideally zero. Meanwhile, an equivalent correction value $Z^{-1}[2]$ is an equivalent correction value on the right in FIG. 6B and is a correction value to reduce a cyan color.

If a measurement color space is identical to a device color space, the following expression is established as with the first embodiment:

$$Z^{-1}[1]=T^{-1}[1]=T[1]=A-B[1]=(Rt-R1,Gt-G1,Bt-B1)$$

$$Z^{-1}[2]=T^{-1}[2]=-T[2]=A-B[2]=(Rt-R2,Gt-G2,Bt-B2)$$

However, in many cases, they are not identical to each other. In such cases, color space conversion is necessary.

If linear conversion can be performed between the both color spaces, a known method such as matrix conversion described in the first embodiment can be used. If linear conversion cannot be performed between the both color spaces, a known method such as a three-dimensional lookup table can be used, as described in the first embodiment.

If the relationship between a correction value $T^{-1}[X]$ and an equivalent correction value $Z^{-1}[X]$ varies depending on a color, the equivalent correction value $Z^{-1}[X]$ can be obtained as described in the first embodiment as follows:

$$Z^{-1}[1]=F(Rt,Gt,Bt)-F(R1,G1,B1)$$

$$Z^{-1}[2]=F(Rt,Gt,Bt)-F(R2,G2,B2)$$

In this case, next, a table parameter G'[X] of ink color conversion & MCS processing is obtained from the equivalent correction value $Z^{-1}[X]$ as follows. F (Rt, Gt, Bt) is set to device color information D[X] (dR, dG, dB) that is inputted to the ink color conversion processing & MCS processing section 2104 illustrated in FIG. 20A in printing an image for measurement. In this case, the following expression is established:

$$Z^{-1}[1]=(dR,dG,dB)-F(R1,G1,B1$$

$$Z^{-1}[2]=(dR,dG,dB)-F(R2,G2,B2)$$

Next, corrected ink color information C' [X], which is obtained in such a way that an equivalent correction value is applied to inputted device color information D[X], then which is subjected to ink color conversion processing G, is found as follows:

$$C^1[1]=G((dR,dG,dB)\times2-F(R1,G1,B1))$$

$$C'[2]=G((dR,dG,dB)\times2-F(R2,G2,B2))$$

where corrected ink color information C'[1] corresponds to a region on the left in FIG. 7B and is ideally equivalent to G (dR, dG, dB). Meanwhile, corrected ink color information C'[2] corresponds to a region on the right in FIG. 7B and whose cyan color component has been reduced.

Lastly, a parameter G'[X] of ink color conversion & MCS processing is decided so as to convert input device color data D[X] to corrected ink color information C'[X] as follows:

$$G'[1](dR,dG,dB)=C'[1]$$

$$G'[2](dR,dG,dB)=C'[2]$$

As described above, in ink color conversion & MCS processing parameter generation processing S2310 illustrated in FIG. 20A, a table parameter G'[X] for the ink color conversion & MCS processing section can be generated for each area. Then, this table parameter G'[X] for the ink color conversion & MCS processing for each area is stored in the HDD 303 of the host PC.

Next, correction processing S2320 by the ink color conversion & MCS processing section illustrated in FIG. 20B will be described.

In Step S2307 of FIG. 20B, first, the parameter G'[X] of ink color conversion & MCS processing generated in the processing S2310 is applied to device color image data D[X] for each pixel corresponding to the area, thereby performing correction.

Specifically, which area includes a pixel of interest to be subjected to image processing is first decided to obtain a print region number n of the area including the pixel of interest. Suppose that the n-th area is an area of interest. An equivalent correction value $Z^{-1}[n]$ associated with this area of interest is obtained by selecting from equivalent correction values stored in the HDD303 of the host PC. Then, the parameter G'[X] of ink color conversion & MCS processing is applied to the device color image data of the pixel of interest as follows. That is, processing in the ink color conversion & MCS processing section 2104 applies the parameter G'[X] to the device color image data D[X] thereby to generate corrected ink color data C'[X].

$$C'[1]=G((dR,dG,dB)\times 2-F(R1,G1,B1))$$

$$C'[2]=G((dR,dG,dB)\times 2-F(R2,G2,B2))$$

where the corrected ink color data C'[1] corresponds to a region on the left in FIG. 7B and is ideally the same blue color as the target color A. The corrected ink color data C'[2] corresponds to a region on the right in FIG. 7B and is a blue color whose cyan color has been reduced.

Next, in Step S2308 of FIG. 20B, corrected ink color data goes through an HS processing section 2106, a TRC processing section 2107 and a quantization processing section 2108 to an output unit 2109, where the data is printed on the print paper 106.

As described in FIGS. 7A and 7B, since in each print region of the print paper 106, a color shift amount T[X] occurs due to variations of ejection volumes during printing, the following relationships are observed:

Color information on the left in the print paper≈a color of print paper corresponding to
$C'[1]+T[1]≈A$ Color information on the right in the print paper≈a color of print paper corresponding to
$C'[2]+T[2]≈A$ where C'[1] is ideally the same blue color as the target color A and T[1] is ideally zero; and C'[2] is a blue color whose cyan color has been reduced by T[2] relative to the target color A, where T[2] is a shift amount to increase a cyan color. In this way, the blue color on the left and the blue color on the right in the print region become approximately the same, thereby reducing an uneven color.

As another example of MCS processing parameter generation processing 2310, the method described with reference to FIG. 8 may be used.

First Variation of Second Embodiment

The present variation relates to a mode corresponding to the first variation of the first embodiment. FIG. 19B is a block diagram illustrating an image processing configuration in which input color conversion processing and ink color conversion processing & MCS processing are integrated, according to the present variation. This variation also can increase a processing speed as with the first variation of the first embodiment.

Second Variation of Second Embodiment

The present variation relates to a mode corresponding to the third variation of the first embodiment. FIG. 19C is a block diagram illustrating an image processing configuration without HS processing, according to the present variation.

Processing according to the present variation is the same as processing illustrated in FIGS. 5A and 5B except that in the present variation HS processing is not performed, as described in the third variation of the first embodiment.

In the aforementioned embodiments, a first color signal can be a color signal in a color space of any of RGB, Lab, Luv, LCbCr and LCH that does not depend on a print head, and a second color signal can be a color signal in a color space that depends on a color of ink ejected by a print head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118673, filed May 24, 2010, which is hereby incorporated by reference herein in its entirety.

What is claimed is:

1. A data processing apparatus for processing image data to be printed on a print medium by using a plurality of nozzles for ejecting inks of a plurality of different colors to eject the inks of the plurality of colors, on the basis of output values based on correction parameters for determining the output values of a plurality of components according to input values of color signals of image data representing the color of an image and composed of signals of a plurality of color elements, the data processing apparatus comprising:

a print control unit configured to control the plurality of nozzles to eject the inks of the plurality of colors, as an image for a correction parameter determination for determining the correction parameters, not to print an image based at least in part on the input values where signal values of the plurality of color elements are not a maximum value or a minimum value among the possible values of the respective signals of the plurality of color elements, but to print on the print medium a plurality of images based on the input values where each of signal values of a plurality of color elements except one particular element is the maximum value and a signal value of the particular element is one of a plurality of different values between the maximum value and the minimum value in a case where each of the plurality of color elements is the particular element, a plurality of images based on the input values where each of signal values of a plurality of color elements except one particular element is the minimum value and a signal value of the particular element is one of the plurality of different values between the maximum value and the minimum value in a case where each of the plurality of color elements is the particular element, and a plurality of images based on the input values where, among signals of a plurality of color elements, a signal value of one particular element is the maximum value, a signal value of another particular element is the minimum value, and a signal value of another element is one of the plurality of different values between the maximum value and the minimum value in a case where each of the plurality of color elements is the particular element;

an obtaining unit configured to obtain color information based on the image for the correction parameter determination printed by the print control unit; and a determination unit configured to determine the correction parameters based on the color information obtained by the obtaining unit.

2. The data processing apparatus according to claim 1, wherein as the image for the correction parameter determination, the print control unit is further configured to cause an image to be printed on the print medium, the image being based on a plurality of input values whose plurality of color-element signal values are equal.

3. The data processing apparatus according to claim 1, wherein as the image for the correction parameter determination, the print control unit is further configured to cause an image to be printed on the print medium, the image being based on the plurality of input values whose signal value of each element among signals of a plurality of color elements is the minimum value or the maximum value.

4. The data processing apparatus according to claim 1, comprising a printing unit having the plurality of nozzles for ejecting the inks of the plurality of different colors, wherein the printing unit is configured to print the image corresponding to the plurality of respective input values via control of the print control unit.

5. The data processing apparatus according to claim 1, wherein the print control unit is further configured to cause the image to be printed on the print medium, the image being based on all of the respective input values whose signal value of each element among signals of the plurality of color elements is the minimum value or the maximum value.

6. The data processing apparatus according to claim 1, wherein as the image for the correction parameter determination, the print control unit is configured to cause a plurality of images to be printed based on, among a plurality of input values corresponding to grid points of the input values in a table defining a correspondence relation between the signals of the plurality of color elements for input values of the color signals and the output values, all of the following input values: the input values where each signal value of a plurality of color elements except one particular element is the maximum value and a signal value of the particular element is one of a plurality of different values between the maximum value and the minimum value in a case where each of the plurality of color elements is the particular element; the input values where each signal value of a plurality of color elements except the one particular element is the minimum value and a signal value of the particular element is one of a plurality of different values between the maximum value and the minimum value in a case where each of the plurality of color elements is the particular element; and the input values where, among signals of a plurality of color elements, a signal value of one particular element is a maximum value, a signal value of another particular element is a minimum value, and a signal value of another element is one of a plurality of different values between the maximum value and the minimum value in a case where each of the plurality of color elements is the particular element.

7. The data processing apparatus according to claim 1, wherein as the image for correction parameter determination, the print control unit is configured to cause an image to be printed on the print medium, the image being only an image based on a plurality of input values whose signal values of the plurality of color elements are equal of the input values whose signal values of the plurality of color elements are not a maximum value or a minimum value among the possible values of the respective signals of the plurality of color elements.

8. The data processing apparatus according to claim 1, wherein the color information is a measurement result obtained by measuring the image for the correction parameter determination by a measurement unit.

9. The data processing apparatus according to claim 8, comprising the measurement unit.

10. The data processing apparatus according to claim 1, wherein the signals of the plurality of color elements are R signals, G signals, and B signals.

11. The data processing apparatus according to claim 1, wherein by use of the color information obtained by the obtaining unit, the determination unit determines the correction parameters by interpolating the color information on an image corresponding to an input value which is different from an input value corresponding to an image caused to be printed by the print control unit.

12. The data processing apparatus according to claim 1,
wherein each nozzle array has the plurality of nozzles arranged in a predetermined direction for each of the inks of the plurality of colors, and
wherein the plurality of nozzle arrays for ejecting the inks of the plurality of colors are arranged side by side in a direction intersecting the predetermined direction, and the print medium and the plurality of nozzle arrays scan relatively in the predetermined direction and in a direction intersecting the predetermined direction, respectively, for printing, and the determination unit is configured to determine a first correction parameter of the correction parameters associated with, among the plurality of nozzle arrays, the nozzles in a first part of each of the plurality of nozzle arrays for printing a first area in the print medium and a second correction parameter of the correction parameters associated with, among the plurality of nozzle arrays, the nozzles in a second part of each of the plurality of nozzle arrays for printing a second area which is different from the first area in the print medium.

13. A data processing method for forming an on a print medium by use of a data processing apparatus provided with a plurality of nozzles for ejecting inks of a plurality of different colors to eject the inks of the plurality of colors, on the basis of output values based on correction parameters for determining the output values of a plurality of components according to input values of color signals of image data representing the color of an image and composed of signals of a plurality of color elements, the data processing method comprising:

a print control step of controlling the plurality of nozzles to eject the inks of the plurality of colors, as an image for a correction parameter determination for determining the correction parameters, not to print an image based at least in part on the input values where signal values of the plurality of color elements are not a maximum value or a minimum value among the possible values of the respective signals of the plurality of color elements, but to print on the print medium a plurality of images based on the input values where each of signal values of a plurality of color elements except one particular element is the maximum value and a signal value of the particular element is one of a plurality of different values between the maximum value and the minimum value in a case where each of the plurality of color elements is the particular element, a plurality of images based on the input values where each of signal values of a plurality of color elements except one particular element is the minimum value and a signal value of the particular element is one of the plurality of different values between the maximum value and the minimum value in a case where each of the plurality of color elements is the particular element, and a plurality of images based on the input values where, among signals of a plurality of color elements, a signal value of one particular element is the maximum value, a signal value of another particular element is the minimum value, and a signal value of another element is one of the plurality of different values between the maximum value and the minimum value in a case where each of the plurality of color elements is the particular element;

obtaining step of obtaining color information based on the image for the correction parameter determination printed in the print control step; and a determination step of determining the correction parameters based on the color information obtained in the obtaining step.

14. The data processing method according to claim 13, wherein each nozzle array has the plurality of nozzles arranged in a predetermined direction for each of the inks of the plurality of colors, and wherein the plurality of nozzle arrays for ejecting the inks of the plurality of colors are arranged side by side in a direction intersecting the predetermined direction, and the print medium and the plurality of nozzle arrays scan relatively in the predetermined direction and in the direction intersecting the predetermined direction, respectively, for printing, and the determination step determines a first correction parameter of the correction parameters associated with, among the plurality of nozzle arrays, the nozzles in a first part of each of the plurality of nozzle arrays for printing a first area in the print medium and a second correction parameter of the correction parameters associated with, among the plurality of nozzle arrays, the nozzles in a second part of each of the plurality of nozzle arrays for printing a second area which is different from the first area in the print medium.

15. A non-transitory computer readable storage medium storing an executable program for causing a computer to execute the data processing method according to claim 13.

16. A data processing apparatus for processing image data to be printed on a print medium by using a plurality of nozzles for ejecting inks of a plurality of different colors to eject the inks of the plurality of colors, on the basis of output values based on correction parameters for determining the output values of a plurality of components according to input values of color signals of image data representing the color of an image and composed of signals of RGB color elements, the data processing apparatus comprising:

a print control unit configured to control the plurality of nozzles to eject the inks of the plurality of colors, as an image for a correction parameter determination for determining the correction parameters, not to print an image based on input values of signal values corresponding to grid points on a surface and inside a color cube composed of three axes which are R, G, and B axes, but to print on the print medium an image based on signal values corresponding to grid points between vertexes of the color cube on edges of the color cube, the image corresponding to grid points on the edges for all of the edges;

an obtaining unit configured to obtain color information based on the image for the correction parameter determination printed by the print control unit; and a determination unit configured to determine the correction parameters based on the color information obtained by the obtaining unit.

17. The data processing apparatus according to claim 16, wherein as the image for the correction parameter determination, the print control unit is further configured to cause an image to be printed on the print medium, the image being based on a plurality of input values whose signal values of the RGB signals are equal.

18. The data processing apparatus according to claim 16, wherein as the image for the correction parameter determination, the print control unit is further configured to cause an image to be printed on the print medium, the image being based on either the input values all of whose RGB signal values are the minimum value or the input values all of whose RGB signal values are the maximum value.

19. The data processing apparatus according to claim 16, further comprising a printing unit having a plurality of nozzles for ejecting the inks of the plurality of different colors, wherein the printing unit is configured to print the image corresponding to the plurality of respective input values via control of the print control unit.

20. The data processing apparatus according to claim 16, wherein each nozzle array has the plurality of nozzles arranged in a predetermined direction for each of the inks of the plurality of colors, and wherein the plurality of nozzle arrays for ejecting the inks of the plurality of colors are arranged side by side in a direction intersecting the predetermined direction, and the print medium and the plurality of nozzle arrays scan relatively in the predetermined direction and in the direction intersecting the predetermined direction, respectively, for printing, and the determination unit is configured to determine a first correction parameter of the correction parameters associated with, among the plurality of nozzle arrays, the nozzles in a first part of each of the plurality of nozzle arrays for printing a first area in the print medium and a second correction parameter of the correction parameters associated with, among the plurality of nozzle arrays, the nozzles in a second part of each of the plurality of nozzle arrays for printing a second area which is different from the first area in the print medium.

* * * * *